United States Patent
Zheng et al.

(10) Patent No.: US 12,430,725 B2
(45) Date of Patent: Sep. 30, 2025

(54) OBJECT CLASS INPAINTING IN DIGITAL IMAGES UTILIZING CLASS-SPECIFIC INPAINTING NEURAL NETWORKS

(71) Applicant: Adobe Inc., San Jose, CA (US)

(72) Inventors: Haitian Zheng, Rochester, NY (US); Zhe Lin, Fremont, CA (US); Jingwan Lu, Santa Clara, CA (US); Scott Cohen, Sunnyvale, CA (US); Elya Shechtman, Seattle, WA (US); Connelly Barnes, Seattle, WA (US); Jianming Zhang, Campbell, CA (US); Ning Xu, Milpitas, CA (US); Sohrab Amirghodsi, Seattle, WA (US)

(73) Assignee: Adobe Inc., San Jose, CA (US)

( * ) Notice: Subject to any disclaimer, the term of this patent is extended or adjusted under 35 U.S.C. 154(b) by 411 days.

(21) Appl. No.: 17/663,317

(22) Filed: May 13, 2022

(65) Prior Publication Data
US 2023/0368339 A1 Nov. 16, 2023

(51) Int. Cl.
*G06T 5/00* (2024.01)
*G06N 3/04* (2023.01)
(Continued)

(52) U.S. Cl.
CPC .............. *G06T 5/77* (2024.01); *G06N 3/04* (2013.01); *G06T 7/11* (2017.01); *G06T 2207/20081* (2013.01); *G06T 2207/20084* (2013.01)

(58) Field of Classification Search
CPC ............ G06T 2207/20084; G06T 5/77; G06T 2207/20081; G06T 7/11; G06N 3/0464; G06N 3/04; G06N 3/0455; G06V 10/82
See application file for complete search history.

(56) References Cited

U.S. PATENT DOCUMENTS 12,056,857 B2 * 8/2024 Zhou .................. G06N 3/02
2018/0374199 A1 12/2018 Shen et al.
(Continued)

FOREIGN PATENT DOCUMENTS

CN 109960453 A 7/2019
CN 111354059 A 6/2020
(Continued)

OTHER PUBLICATIONS

Yu, Yingchen, et al. "Diverse image inpainting with bidirectional and autoregressive transformers." Proceedings of the 29th ACM International Conference on Multimedia. 2021.*
(Continued)

*Primary Examiner* — Li Liu
(74) *Attorney, Agent, or Firm* — Keller Preece PLLC

(57) ABSTRACT

The present disclosure relates to systems, methods, and non-transitory computer readable media that generate inpainted digital images utilizing class-specific cascaded modulation inpainting neural network. For example, the disclosed systems utilize a class-specific cascaded modulation inpainting neural network that includes cascaded modulation decoder layers to generate replacement pixels portraying a particular target object class. To illustrate, in response to user selection of a replacement region and target object class, the disclosed systems utilize a class-specific cascaded modulation inpainting neural network corresponding to the target object class to generate an inpainted digital image that portrays an instance of the target object class within the replacement region. Moreover, in one or more embodiments the disclosed systems train class-specific cascaded modulation inpainting neural networks corresponding to a variety of target object classes, such as a sky object class, a water object class, a ground object class, or a human object class.

20 Claims, 19 Drawing Sheets

(51) Int. Cl.
    *G06T 5/77*     (2024.01)
    *G06T 7/11*     (2017.01)

(56) References Cited

U.S. PATENT DOCUMENTS

| | | |
|---|---|---|
| 2019/0196698 A1 | 6/2019 | Cohen et al. |
| 2020/0134834 A1 | 4/2020 | Pao et al. |
| 2020/0311874 A1 | 10/2020 | Ye et al. |
| 2021/0150682 A1 | 5/2021 | Sytnik et al. |
| 2021/0248721 A1 | 8/2021 | Tian et al. |
| 2021/0383242 A1 | 12/2021 | Ostyakov et al. |
| 2021/0390660 A1 | 12/2021 | Baek et al. |
| 2021/0407051 A1 | 12/2021 | Pardeshi et al. |
| 2022/0068037 A1* | 3/2022 | Pardeshi ............ G06N 3/045 |
| 2022/0083806 A1 | 3/2022 | Cho |
| 2022/0180490 A1 | 6/2022 | Jo et al. |
| 2023/0196760 A1 | 6/2023 | Dorum et al. |
| 2023/0259587 A1* | 8/2023 | Lin ..................... G06T 5/60 |
| 2023/0351558 A1* | 11/2023 | Chen ................... G06T 5/77 |
| 2023/0360180 A1* | 11/2023 | Zheng ................. G06T 5/77 |

FOREIGN PATENT DOCUMENTS

| | | |
|---|---|---|
| GB | 2586678 A | 3/2021 |
| KR | 20200115001 A | 10/2020 |
| WO | 2021/212810 A1 | 10/2021 |

OTHER PUBLICATIONS

Roy, Hiya, et al. "Image inpainting using frequency-domain priors." Journal of Electronic Imaging 30.2 (2021): 023016-023016.*

Xu, Rui, et al. "Positional encoding as spatial inductive bias in gans." Proceedings of the IEEE/CVF Conference on Computer Vision and Pattern Recognition. 2021.*

Haoming Cai, Jingwen He, Yu Qiao and Chao Dong, "Toward Interactive Modulation for Photo-Realistic Image Restoration," 2021 IEEE/CV Conference on Computer Vision and Pattern Recognition Workshops (CVPRW), Nashville, TN, USA, 2021, pp. 294-303, doi:10.1109/CVPRW53098.2021.00039 (Year: 2021).

Karras, T., Laine, S., Aittala, M., Hellsten, J., Lehtinen, J., and Aila, T., "Analyzing and Improving the Image Quality of StyleGAN", arXiv e-prints, 2019. doi: 10.48550/arXiv.1912.04958 (Year: 2019).

Kim, H., Choi, Y., Kim, J., Yoo, S., and Uh, Y., "Exploiting Spatial Dimensions of Latent in GAN for Real-time Image Editing", arXiv e-prints, 2021. doi:10.48550/arXiv.2104.14754 (Year: 2021).

Suvorov, R., "Resolution-robust Large Mask Inpainting with Fourier Convolutions", arXiv e-prints, 2021. doi: 10.48550/arXiv.2109.07161 (Year: 2021).

Xiao, Q., Li, G., and Chen, Q., "Deep Inception Generative Network for Cognitive Image Inpainting", arXiv e-prints, 2018. doi:10.48550/arXiv.1812.01458 (Year: 2018).

Zhao, S., "Large Scale Image Completion via Co-Modulated Generative Adversarial Networks", arXiv e-prints, 2021. doi: 10.48550/arXiv.2103.10428 (Year: 2021).

Zhu, M., "Image Inpainting by End-to-End Cascaded Refinement With Mask Awareness", IEEE Transactions on Image Processing, vol. 30, IEEE, pp. 4855-4866, 2021. doi:10.1109/TIP.2021.3076310 (Year: 2021).

U.S. Appl. No. 17/661,985, Jul. 26, 2024, Notice of Allowance.
U.S. Appl. No. 17/650,967, Sep. 6, 2024, Office Action.

Badour AlBahar, Jingwan Lu, Jimei Yang, Zhixin Shu, Eli Shechtman, and Jia-Bin Huang. Pose with Style: Detail-preserving pose-guided image synthesis with conditional stylegan. ACM Transactions on Graphics, 2021.

Jean-Francois Aujol, Guy Gilboa, Tony Chan, and Stanley Osher. Structure-texture image decomposition-modeling, algorithms, and parameter selection. International journal of computer vision, 67(1):111-136, 2006.

Coloma Ballester, Marcelo Bertalmio, Vicent Caselles, Guillermo Sapiro, and Joan Verdera. Filling-in by joint inter-polation of vector fields and gray levels. IEEE transactions on image processing, 10(8):1200-1211, 2001.

Connelly Barnes, Eli Shechtman, Adam Finkelstein, and Dan B Goldman. Patchmatch: A randomized correspondence algorithm for structural image editing. ACM Trans. Graph., 28(3):24, 2009.

Marcelo Bertalmio, Luminita Vese, Guillermo Sapiro, and Stanley Osher. Simultaneous structure and texture image inpainting. IEEE transactions on image processing, 12(8):882-889, 2003.

Tony F Chan and Jianhong Shen. Nontexture inpainting by curvature-driven diffusions. Journal of visual communication and image representation, 12(4):436-449, 2001.

Lu Chi, Borui Jiang, and Yadong Mu. Fast fourier convolution. Advances in Neural Information Processing Systems, 33, 2020.

Taeg Sang Cho, Moshe Butman, Shai Avidan, and William T Freeman. The patch transform and its applications to image editing. In 2008 IEEE Conference on Computer Vision and Pattern Recognition, pp. 1-8. IEEE, 2008.

Antonio Criminisi, Patrick Perez, and Kentaro Toyama. Region filling and object removal by exemplar-based image inpainting. IEEE Transactions on image processing, 13(9):1200-1212, 2004.

Alexei A Efros and William T Freeman. Image quilting for texture synthesis and transfer. In Proceedings of the 28th annual conference on Computer graphics and interactive techniques, pp. 341-346. ACM, 2001.

Ian Goodfellow, Jean Pouget-Abadie, Mehdi Mirza, Bing Xu, David Warde-Farley, Sherjil Ozair, Aaron Courville, and Yoshua Bengio. Generative adversarial nets. In Advances in neural information processing systems, pp. 2672-2680, 2014.

Ishaan Gulrajani, Faruk Ahmed, Martin Arjovsky, Vincent Dumoulin, and Aaron Courville. Improved training of wasserstein gans. arXiv preprint arXiv:1704.00028, 2017.

Martin Heusel, Hubert Ramsauer, Thomas Unterthiner, Bernhard Nessler, and Sepp Hochreiter. Gans trained by a two time-scale update rule converge to a local nash equilibrium. In Advances in Neural Information Processing Systems, pp. 6626-6637, 2017.

Yibing Song Wei Huang Hongyu Liu, Bin Jiang and Chao Yang. Rethinking image inpainting via a mutual encoder-decoder with feature equalizations. InProceedings of the European Conference on Computer Vision, 2020.

Xun Huang and Serge Belongie. Arbitrary style transfer in real-time with adaptive instance normalization. InProceedings of the IEEE International Conference on Computer Vision, pp. 1501-1510, 2017.

Xun Huang, Ming-Yu Liu, Serge Belongie, and Jan Kautz. Multimodal unsupervised image-to-image translation. In Proceedings of the European conference on computer vision (ECCV), pp. 172-189, 2018.

Satoshi Iizuka, Edgar Simo-Serra, and Hiroshi Ishikawa. Globally and locally consistent image completion. ACM Transactions on Graphics (ToG), 36(4):1-14, 2017.

Justin Johnson, Alexandre Alahi, and Li Fei-Fei. Perceptual losses for real-time style transfer and super-resolution. In European conference on computer vision, pp. 694-711. Springer, 2016.

Tero Karras, Samuli Laine, and Timo Aila. A style-based generator architecture for generative adversarial networks. In Proceedings of the IEEE/CVF Conference on Computer Vision and Pattern Recognition, pp. 4401-4410, 2019.

Tero Karras, Samuli Laine, Miika Aittala, Janne Hellsten, Jaakko Lehtinen, and Timo Aila. Analyzing and improving the image quality of StyleGAN. InProc. CVPR, 2020.

Hyunsu Kim, Yunjey Choi, Junho Kim, Sungjoo Yoo, and Youngjung Uh. Exploiting spatial dimensions of latent in gan for real-time image editing. In Proceedings of the IEEE Conference on Computer Vision and Pattern Recognition, 2021.

Diederik P Kingma and Jimmy Ba. Adam: A method for stochastic optimization.arXiv preprint arXiv:1412.6980, 2014.

Vivek Kwatra, Irfan Essa, Aaron Bobick, and Nipun Kwatra. Texture optimization for example-based synthesis. In ACM SIGGRAPH 2005 Papers, pp. 795-802. 2005.

Yanwei Li, Hengshuang Zhao, Xiaojuan Qi, Liwei Wang, Zeming Li, Jian Sun, and Jiaya Jia. Fully convolutional networks for panoptic segmentation. In Proceedings of the IEEE/CVF Conference on Computer Vision and Pattern Recognition, pp. 214-223, 2021.

Guilin Liu, Fitsum A Reda, Kevin J Shih, Ting-Chun Wang, Andrew Tao, and Bryan Catanzaro. Image inpainting for irregular holes

(56) References Cited

OTHER PUBLICATIONS using partial convolutions. In Proceedings of the European Conference on Computer Vision (ECCV), pp. 85-100, 2018.
Wenjie Luo, Yujia Li, Raquel Urtasun, and Richard Zemel. Understanding the effective receptive field in deep convolutional neural networks. In Proceedings of the 30th International Conference on Neural Information Processing Systems, pp. 4905-4913, 2016.
Lars Mescheder, Andreas Geiger, and Sebastian Nowozin. Which training methods for gans do actually converge? In International conference on machine learning, pp. 3481-3490. PMLR, 2018.
Takeru Miyato, Toshiki Kataoka, Masanori Koyama, and Yuichi Yoshida. Spectral normalization for generative adversarial networks. arXiv preprint arXiv:1802.05957, 2018.
Kamyar Nazeri, Eric Ng, Tony Joseph, Faisal Z Qureshi, and Mehran Ebrahimi. Edgeconnect: Generative image inpainting with adversarial edge learning. arXiv preprint arXiv:1901.00212, 2019.
Taesung Park, Ming-Yu Liu, Ting-Chun Wang, and Jun-Yan Zhu. Semantic image synthesis with spatially-adaptive normalization. In Proceedings of the IEEE Conference on Computer Vision and Pattern Recognition, 2019.
Taesung Park, Jun-Yan Zhu, Oliver Wang, Jingwan Lu, Eli Shechtman, Alexei A Efros, and Richard Zhang. Swapping autoencoder for deep image manipulation. arXiv preprint arXiv:2007.00653, 2020.
Deepak Pathak, Philipp Krahenbuhl, Jeff Donahue, Trevor Darrell, and Alexei A Efros. Context encoders: Feature learning by inpainting. In Proceedings of the IEEE conference on computer vision and pattern recognition, pp. 2536-2544, 2016.
Jialun Peng, Dong Liu, Songcen Xu, and Houqiang Li. Generating diverse structure for image inpainting with hierarchical vq-vae. In Proceedings of the IEEE/CVF Conference on Computer Vision and Pattern Recognition (CVPR), pp. 10775-10784, 2021.
Yurui Ren, Xiaoming Yu, Ruonan Zhang, Thomas H. Li, Shan Liu, and Ge Li. Structureflow: Image inpainting via structure-aware appearance flow. In IEEE International Conference on Computer Vision (ICCV), 2019.
Tim Salimans and Durk P Kingma. Weight normalization: A simple reparameterization to accelerate training of deep neural networks. Advances in neural information processing systems, 29:901-909, 2016.
Jianhong Shen and Tony F Chan. Mathematical models for local nontexture inpaintings. SIAM Journal on Applied Mathematics, 62(3):1019-1043, 2002.
Yuhang Song, Chao Yang, Yeji Shen, Peng Wang, Qin Huang, and C-C Jay Kuo. Spg-net: Segmentation prediction and guidance network for image inpainting.arXiv preprint arXiv:1805.03356, 2018.
Roman Suvorov, Elizaveta Logacheva, Anton Mashikhin, Anastasia Remizova, Arsenii Ashukha, Aleksei Silvestrov, Naejin Kong, Harshith Goka, Kiwoong Park, and Victor Lempitsky. Resolution-robust large mask inpainting with fourier convolutions.arXiv preprint arXiv:2109.07161, 2021.
Zhentao Tan, Dongdong Chen, Qi Chu, Menglei Chai, Jing Liao, Mingming He, Lu Yuan, Gang Hua, and Nenghai Yu. Semantic image synthesis via efficient class-adaptive normalization.arXiv preprint arXiv:2012.04644, 2020.
Ziyu Wan, Jingbo Zhang, Dongdong Chen, and Jing Liao. High-fidelity pluralistic image completion with transformers.arXiv preprint arXiv:2103.14031, 2021.
Xintao Wang, Ke Yu, Chao Dong, and Chen Change Loy. Recovering realistic texture in image super-resolution by deep spatial feature transform. In Proceedings of the IEEE conference on computer vision and pattern recognition, pp. 606-615, 2018.
Zhou Wang, Alan C Bovik, Hamid R Sheikh, Eero P Simoncelli, et al. Image quality assessment: from error visibility to structural similarity.IEEE transactions on image processing, 13(4):600-612, 2004.
Wei Xiong, Jiahui Yu, Zhe Lin, Jimei Yang, Xin Lu, Connelly Barnes, and Jiebo Luo. Foreground-aware image inpainting. In Proceedings of the IEEE/CVF Conference on Computer Vision and Pattern Recognition, pp. 5840-5848, 2019.
Chao Yang, Xin Lu, Zhe Lin, Eli Shechtman, Oliver Wang, and Hao Li. High-resolution image inpainting using multi-scale neural patch synthesis. In2017 IEEE Conference on Computer Vision and Pattern Recognition, CVPR 2017, Honolulu, HI, USA, Jul. 21-26, 2017, pp. 4076-4084, 2017.
Jie Yang, Zhiquan Qi, and Yong Shi. Learning to incorporate structure knowledge for image inpainting. In Proceedings of the AAAI Conference on Artificial Intelligence, vol. 34, pp. 12605-12612, 2020.
Zili Yi, Qiang Tang, Shekoofeh Azizi, Daesik Jang, and Zhan Xu. Contextual residual aggregation for ultra high-resolution image inpainting. In Proceedings of the IEEE/CVF Conference on Computer Vision and Pattern Recognition, pp. 7508-7517, 2020.
Jiahui Yu, Zhe Lin, Jimei Yang, Xiaohui Shen, Xin Lu, and Thomas S Huang. Generative image inpainting with contextual attention. In Proceedings of the IEEE conference on computer vision and pattern recognition, pp. 5505-5514, 2018.
Jiahui Yu, Zhe Lin, Jimei Yang, Xiaohui Shen, Xin Lu, and Thomas S Huang. Free-form image inpainting with gated convolution. InProceedings of the IEEE International Conference on Computer Vision, pp. 4471-4480, 2019.
Yu Zeng, Zhe Lin, Huchuan Lu, and Vishal M. Patel. Cr-fill: Generative image inpainting with auxiliary contextual reconstruction. InProceedings of the IEEE International Conference on Computer Vision, 2021.
Yu Zeng, Zhe Lin, Jimei Yang, Jianming Zhang, Eli Shechtman, and Huchuan Lu. High-resolution image inpainting with iterative confidence feedback and guided upsampling. arXiv preprint arXiv:2005.11742, 2020.
Richard Zhang, Phillip Isola, Alexei A Efros, Eli Shechtman, and Oliver Wang. The unreasonable effectiveness of deep features as a perceptual metric. In Proceedings of the IEEE Conference on Computer Vision and Pattern Recognition, pp. 586-595, 2018.
Shengyu Zhao, Jonathan Cui, Yilun Sheng, Yue Dong, Xiao Liang, Eric I Chang, and Yan Xu. Large scale image completion via co-modulated generative adversarial networks. arXiv preprint arXiv:2103.10428, 2021.
Haitian Zheng, Haofu Liao, Lele Chen, Wei Xiong, Tianlang Chen, and Jiebo Luo. Example-guided image synthesis using masked spatial-channel attention and self-supervision. In European Conference on Computer Vision, pp. 422-439. Springer, 2020.
Bolei Zhou, Agata Lapedriza, Aditya Khosla, Aude Oliva, and Antonio Torralba. Places: A 10 million image database for scene recognition. IEEE transactions on pattern analysis and machine intelligence, 40(6):1452-1464, 2017.
Github; PanopticFCN: Fully Convolutional Networks for Panoptic Segmentation; Date downloaded May 26, 2022; https://github.com/dvlab-research/PanopticFCN.
Search and Examination Report as received in GB application 2303646.0 dated Oct. 3, 2023.
U.S. Appl. No. 17/650,967, Nov. 27, 2024, Notice of Allowance.
Office Action as received in Chinese Application No. 202310157677.5 dated Jul. 26, 2025.
Yin Wei-wei, Li Rong-wei, Wu Le-nan. "Joint Source-Channel Coding/Modulation Based on NN", Journal of Agglied Sciences, vol. 23, No. 1, 3 pages, Jan. 2005.

* cited by examiner

| Methods | FID↓ | LPIPS↓ | U-IDS↑ | P-IDS↑ |
|---|---|---|---|---|
| CM-GAN | 1.749 | 0.195 | 37.09 | 20.69 |
| CoModGAN | 3.724 | 0.229 | 32.38 | 14.68 |
| Lama | 3.864 | 0.195 | 29.57 | 10.08 |
| ProFill | 7.700 | 0.230 | 21.19 | 3.87 |
| CRFill | 9.657 | 0.2331 | 22.90 | 5.53 |
| DeepFill v2 | 13.595 | 0.371 | 14.23 | 1.67 |
| DiverseStructure | 16.003 | 0.399 | 10.72 | 0.47 |
| EdgeConnect | 12.086 | 0.414 | 9.21 | 0.28 |
| ICT | 16.405 | 0.424 | 8.12 | 0.25 |
| HiFill | 37.484 | 0.336 | 9.86 | 0.96 |
| StructureFlow | 28.252 | 0.489 | 6.05 | 0.13 |
| MEDFE | 35.454 | 0.445 | 7.10 | 0.35 |

*Fig. 11*

| Model | #Params of $\mathcal{G}$ | #Params of $\mathcal{D}$ | FLOPs |
|---|---|---|---|
| CoModGAN | 79.79M | 28.98M | 345.54G |
| CM-GAN | 75.28M | 28.98M | 373.60G |

Receiving An Indication Of A Replacement Region Of A Digital Image And A Target Object Class 1402

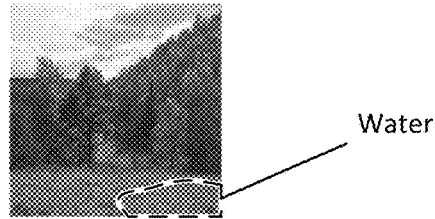

Water

Generating Replacement Pixels Utilizing A Class-Specific Cascaded Modulation Inpainting Neural Network 1404

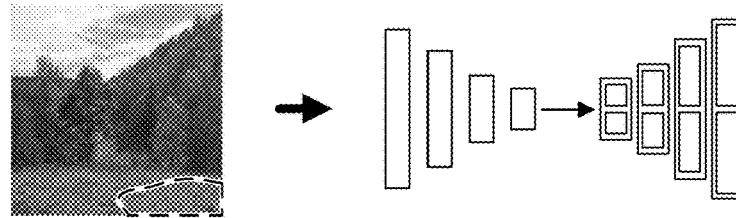

Providing An Inpainted Digital Image Comprising The Replacement Pixels Such That The Inpainted Digital Image Portrays An Instance Of The Target Object Class 1406

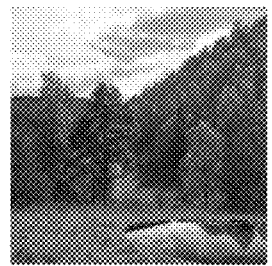

*Fig. 14*

OBJECT CLASS INPAINTING IN DIGITAL IMAGES UTILIZING CLASS-SPECIFIC INPAINTING NEURAL NETWORKS

BACKGROUND

In the field of digital image editing, computer-implemented models have become increasingly effective at producing realistic images from randomly sampled seeds or incomplete, masked digital images. Indeed, generative adversarial networks ("GANs") or patch matching models, have revolutionized digital image synthesis processes, enabling photorealistic rendering of complex scenes and inpainting digital images with missing or flawed pixels. Despite the advances of conventional digital image systems that utilize these models, however, conventional systems continue to suffer from a number of disadvantages, particularly in relation to accuracy, efficiency, and flexibility of implementing computing devices.

SUMMARY

This disclosure describes one or more embodiments of systems, methods, and non-transitory computer readable media that solve one or more of the foregoing or other problems in the art by inpainting digital images to portray particular object classes utilizing a class-specific inpainting neural network. In particular, in one or more implementations the disclosed systems utilize a neural network design that includes an encoder that extracts multi-scale feature representations from an input image with holes and a decoder with cascaded modulation layers at each resolution level. For example, in one or more embodiments, at each cascaded modulation layer of the decoder the disclosed systems apply global modulation to perform coarse semantic-aware structure synthesis, then utilize spatial modulation to adjust the feature map in a spatially adaptive fashion. The disclosed systems train one or more inpainting neural networks by masking a specific object class, such as sky regions, from training digital images. The cascaded modulation inpainting neural network thus learns to inpaint masked regions of digital images with pixels portraying the specific object class. The disclosed systems can utilize such class-specific inpainting neural networks in a variety of user interface applications to efficiently, flexibly, and accurately regenerate or synthesize target object classes in digital images.

BRIEF DESCRIPTION OF THE DRAWINGS

This disclosure describes one or more embodiments of the invention with additional specificity and detail by referencing the accompanying figures. The following paragraphs briefly describe those figures, in which:

FIG. 11 illustrates a table of experimental results in accordance with one or more embodiments;

FIG. 12 illustrates an additional table of experimental results in accordance with one or more embodiments;

FIG. 14 illustrates a flowchart of a series of acts for generating an inpainted digital image utilizing a class-specific cascaded modulation inpainting neural network in accordance with one or more embodiments;

DETAILED DESCRIPTION

Figure 1:
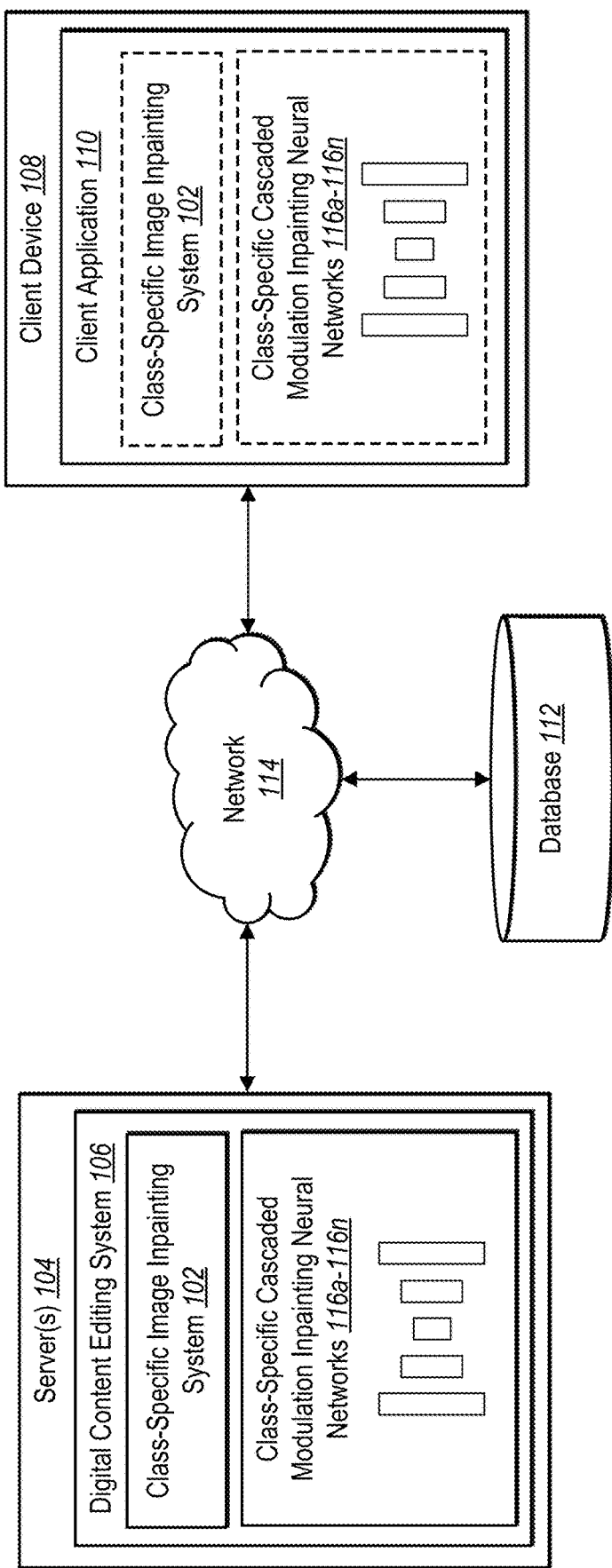
FIG. 1 illustrates an example system environment in which a class-specific image inpainting system operates in accordance with one or more embodiments.

This disclosure describes one or more embodiments of a class-specific image inpainting system that generates inpainted digital images utilizing a class-specific inpainting neural network. In one or more embodiments, the class-specific image inpainting system utilizes cascaded modulation decoder layers that decompose an inference into multiple stages (e.g., global prediction and local refinement). For example, in each decoder layer, the class-specific image inpainting system starts with global code modulation that captures the global-range image structures followed by a spatially adaptive modulation that refines the global predictions. In addition, the class-specific image inpainting system utilizes a unique approach to train the class-specific inpainting neural network. In particular, the class-specific image inpainting system generates class-segmented digital images utilizing a panoptic segmentation algorithm and then utilizes annotated class-specific regions as mask regions for training the class-specific inpainting neural network. By using a mask-conditioned adversarial loss for training, the class-specific image inpainting system learns parameters of a class-specific inpainting neural network that accurately, efficiently, and flexibly generates inpainted digital images portraying particular target object classes.

As just mentioned, in one or more implementations, the class-specific image inpainting system utilizes a cascaded modulation inpainting neural network. For example, the class-specific image inpainting system utilizes a plurality of convolutional neural network encoder layers to process a digital image at different scales/resolutions to generate encoded feature vectors. Moreover, in one or more implementations the class-specific image inpainting system utilizes these encoded feature vectors to generate an image encoding (e.g., global feature code or other feature vector) that represents global features of the digital image. As mentioned, in one or more implementations, the class-specific image inpainting system utilizes encoder layers that include Fourier convolution blocks to expand the receptive field of the encoder.

In addition, the class-specific image inpainting system utilizes a unique cascaded modulation decoder architecture to generate an inpainted digital image. To illustrate, each cascaded modulation layer includes a global modulation block and an additional modulation block (such as a spatial modulation block or another global modulation block). In one or more embodiments, these modulation blocks implement different modulation operations to generate different feature map representations. Thus, for example, a global modulation block applies a modulation based on a global feature code to an input global feature map to generate a new global feature map. Similarly, a spatial modulation block can apply a spatial modulation (e.g., based on a spatial tensor together with a global feature code) to an input local feature map to generate a new local feature map.

In some embodiments, the class-specific image inpainting system 102 utilizes a different architecture for a class-specific inpainting neural network. For example, in one or more implementations, the class-specific image inpainting system 102 utilizes an inpainting neural network that includes encoder layers and decoder layers without cascaded modulation decoder layers. Thus, the class-specific image inpainting system 102 can utilize a variety of class-specific inpainting neural networks.

As mentioned above, the class-specific image inpainting system also learns parameters for the class-specific inpainting neural network. For example, the class-specific image inpainting system processes a repository of digital images utilizing a panoptic segmentation model to segment objects corresponding to particular classes portrayed in the digital images. The class-specific image inpainting system filters those digital images portraying a target object class and utilizes the corresponding masks to train the class-specific inpainting neural network. In particular, the class-specific image inpainting system utilizes the class-specific inpainting neural network to generate an inpainted digital image from a class-segmented digital image. The class-specific image inpainting system then utilizes a discriminator network to generate an authenticity prediction for the inpainted digital image. The class-specific image inpainting system determines an adversarial loss from the authenticity prediction and utilizes the adversarial loss to modify parameters of the class-specific inpainting neural network.

In one or more embodiments, the class-specific image inpainting system utilizes positional encoding in training and implementing the class-specific inpainting neural network. In particular, the class-specific image inpainting system determines positional encodings reflecting Fourier features of feature maps for different layers of the class-specific inpainting neural network. The class-specific image inpainting system injects these positional encodings to the input of the class-specific inpainting neural network and each layer of the network (i.e., encoder layers and decoder layers) to enhance the structural prediction capacity of the model.

Once trained, the class-specific image inpainting system also utilizes the class-specific inpainting neural network to generate inpainted digital images. In particular, the class-specific image inpainting system utilizes a variety of user interfaces and corresponding workflows to generated inpainted digital images portraying the target object class utilizing the class-specific inpainting neural network. For example, the class-specific image inpainting system provides a user interface with an initial digital image. In response to a user interaction with the digital image (e.g., painting of a new sky region or a segmentation selection to replace an existing sky region), the class-specific image inpainting system utilizes the class-specific inpainting neural network to generate replacement pixels portraying in instance of the target object class. Thus, the class-specific image inpainting system 102 can generate a replacement region reflecting a target object that is entirely absent from the input (e.g., masked from the input image).

As suggested above, conventional systems exhibit a number of shortcomings or disadvantages, particularly in accuracy, flexibility, and efficiency of implementing computing devices. For example, conventional systems often struggle to generate plausible image structures when dealing with large holes in complex images. To illustrate, conventional systems often generate inpainted digital images with unrealistic content and visual artifacts. For example, although patch matching approaches are often effective for generating stationary textures or completing simple shapes they cannot hallucinate new textures or image structures. Similarly, deep learning approaches often struggle to generate content that is consistent both within the hole and with existing digital content outside the hole. In other words, conventional systems struggle to infer semantic clues from an incomplete digital image while propagating low-level visual features in a global range.

In addition, conventional systems also struggle to generate replacement pixels for semantic regions that are entirely absent from input. For example, conventional systems are often designed to borrow pixels from known regions. These systems therefore struggle to accurately complete semantic regions where that are missing (or masked) from an input digital image.

These inaccuracies often result from inflexibility of conventional systems. For example, inaccuracies in inpainting large holes are partially due to the lack of flexible network structures that can capture both the long-range dependency and the high-level semantics of an image. Thus, for example, patching matching approaches lack mechanisms to model high-level semantics for completing new semantic structure inside the hole. Similarly, deep learning approaches lack structural approaches to capture semantic information for global structure completion. Indeed, one recent deep learning approach—as described by Shengyu Zhao, Jonathan Cui, Yilun Sheng, Yue Dong, Xiao Liang, Eric I Chang, and Yan Xu, in Large scale image completion via co-modulated generative adversarial networks, arXiv preprint arXiv: 2103.10428 (2021) (hereinafter "CoModGAN")—utilizes a co-modulation mechanism that decodes encoded image features with global code modulation. However, this approach is limited in recovering spatial or other feature details and utilizes skip connections that pass invalid contextual features generated by an encoder to the decoder inside the hole. Moreover, many new inpainting models are inflexible in that they are incompatible with the most recent GAN architectures, such as the architecture described by Tero Karras, Samuli Laine, Miika Aittala, Janne Hellsten, Jaakko Lehtinen, and Timo Aila in Analyzing and improving the image quality of StyleGAN, Proc. CVPR (2020) (hereinafter StyleGan2), which is incorporated by reference herein in its entirety.

Moreover, conventional systems are also inaccurate in their encoding approaches. Indeed, some conventional systems utilize full convolutional models that suffer from slow growth of effective receptive field at early stages of the encoder. Accordingly, utilizing strided convolution within the encoder can generate invalid features inside the hole region, making the feature correction at decoding stage more challenging. Accordingly, conventional systems often generate additional inaccuracies in utilizing convolutional encoder architectures.

Furthermore, conventional systems are often inflexible and unable to generate particular target object classes in generating replacement pixels. Indeed, conventional generative models are often agnostic to the particular objects generated in inpainting a digital image. Accordingly, these models are unable to generate replacement pixels that align to a target object class desired for a particular context. Some conventional systems have been developed for inserting sky areas within a digital image. However, conventional systems are often unable to generate new, novel sky but rather reproduce or copy existing sky images. Furthermore, conventional systems have compatibility issues with non-sky areas. In particular, conventional systems insert sky areas that conflict with the geometry, lighting, and other visual features of the digital image.

In addition, conventional systems are often inefficient, and require extensive computer resources to implement. Indeed, systems that seek to improve on the accuracy and flexibility concerns just discussed tend to further exacerbate these inefficiencies. To illustrate, improving accuracy of deep learning approaches often results in additional learned parameters and additional computing resources in memory and processing power to train and implement the deep learning models.

In one or more embodiments, the class-specific image inpainting system provides a variety of improvements or advantages over conventional systems. For example, by utilizing a cascaded modulation inpainting neural network, one or more embodiments of the class-specific image inpainting system generates more realistic and accurate inpainted digital images. As explained in greater detail below (e.g., with regard to FIG. 11) experimental results demonstrate that example embodiments of the class-specific image inpainting system significantly improve accuracy relative to conventional systems.

In addition, the class-specific image inpainting system is able to accurately generate semantic regions, (such as a sky region) that is entirely absent (e.g., masked) from an input digital image. Indeed, by utilizing a class-specific inpainting neural network the class-specific image inpainting system 102 can completely replace sky regions (or other semantic regions) from a digital image while accurately matching the new region to the contextual features of the rest of the digital image.

As mentioned above, in one or more embodiments the class-specific image inpainting system utilizes cascaded modulation decoder layers. For example, in some implementations these cascaded modulation decoder layers include global code modulation (that captures the global-range image structures) and spatially adaptive modulation (that refines the global predictions in a spatially-varying manner). Therefore, unlike conventional systems, in one or more implementations the class-specific image inpainting system provides a mechanism to correct distorted local details, making the inpainted pixels coherent with the rest of the image globally and locally. Furthermore, in some embodiments, the class-specific image inpainting system utilizes modulation blocks (e.g., without instance normalization) to make the design compatible with more recent GAN architectures, such as StyleGAN2.

Moreover, in one or more embodiments, the class-specific image inpainting system also improves accuracy by utilizing a unique encoding architecture. For example, the class-specific image inpainting system utilizes fast Fourier convolution blocks within the encoder layers, expanding the receptive field of the encoder at early stages to allow the network encoder to better capture global structure. Indeed, the class-specific image inpainting system 102 utilizes fast Fourier convolutional blocks at each encoder layer (at different resolutions) to propagate features at early stages, which avoids generating invalid features inside the hole and improves results.

In one or more embodiments, the class-specific image inpainting system further improves accuracy by utilizing positional encodings. Indeed, as mentioned above, the class-specific image inpainting system generates positional encodings that reflect Fourier features for each feature map. The class-specific image inpainting system utilizes these positional encodings as input to the inpainting neural network and at encoder layers and decoder layers to enhance structural prediction accuracy.

In addition, the class-specific image inpainting system improves accuracy and flexibility in generating replacement pixels for digital images that portray one or more instances of a particular target object class. Indeed, rather than generating generic replacement pixels, the class-specific image inpainting system provides improved accuracy and flexibility in generating replacement pixels that portray a desired object class. Thus, in one or more implementations, a client device selects a target object class and the class-specific image inpainting system utilizes a corresponding class-specific inpainting neural network to generate replacement pixels portraying one or more instances of the desired object class. Moreover, by utilizing a class-specific inpainting neural network, the class-specific image inpainting system utilizes a data-driven, generative model, to generate diverse, novel regions that are coherent with surrounding image contents.

Furthermore, the class-specific image inpainting system improves accuracy and flexibility without sacrificing efficiency. Indeed, as discussed in greater detail below (e.g., with regard to FIG. 12), in one or more implementations the class-specific image inpainting system improves accuracy relative to conventional systems without increasing the number of parameters (and in some cases decreasing the number of parameters) utilized to generate the inpainted digital image. Accordingly, the class-specific image inpainting system improves accuracy without sacrificing (and, in some instances, improving) efficiency of computer memory and processing power relative to conventional systems.

Additional detail regarding the class-specific image inpainting system will now be provided with reference to the figures. For example, FIG. 1 illustrates a schematic diagram of an example system environment for implementing the class-specific image inpainting system 102 in accordance with one or more embodiments. An overview of the class-specific image inpainting system 102 is described in relation to FIG. 1. Thereafter, a more detailed description of the components and processes of the class-specific image inpainting system 102 is provided in relation to the subsequent figures.

As shown, the environment includes server(s) 104, a client device 108, a database 112, and a network 114. Each of the components of the environment communicate via the network 114, and the network 114 is any suitable network over which computing devices communicate. Example networks are discussed in more detail below in relation to FIG. 12.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 12. Although FIG. 1 illustrates a single instance of the client device 108, in some embodiments, the environment includes multiple different client devices, each associated with a different user (e.g., a digital image editor). The client device 108 communicates with the server(s) 104 via the network 114. For example, the client device 108 provides information to server(s) 104 indicating client device interactions (e.g., digital image selections, user interactions requesting generation or modification of digital images, or other input) and receives information from the server(s) 104 such as generated inpainted digital images. Thus, in some cases, the class-specific image inpainting system 102 on the server(s) 104 provides and receives information based on client device interaction via the client device 108.

As shown in FIG. 1, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. Based on instructions from the client application 110, the client device 108 presents or displays information to a user, including digital images such as inpainted digital images, masked digital images, and/or selectable options for generating and editing digital images (e.g., to indicate objects to remove and/or inpaint). In some cases, the client application 110 includes all or part of the class-specific image inpainting system 102 and/or class-specific cascaded modulation inpainting neural networks 116a-116n (or other class-specific inpainting neural networks).

As illustrated in FIG. 1, the environment includes the server(s) 104. The server(s) 104 generates, tracks, stores, processes, receives, and transmits electronic data, such as indications of client device interactions and/or pixels of digital images. For example, the server(s) 104 receives data from the client device 108 in the form of an indication of a client device interaction to generate an inpainted digital image. In response, the server(s) 104 transmits data to the client device 108 to cause the client device 108 to display or present an inpainted digital image based on the client device interaction.

In some embodiments, the server(s) 104 communicates with the client device 108 to transmit and/or receive data via the network 114, including client device interactions, inpainted digital images, and/or other data. In some embodiments, the server(s) 104 comprises a distributed server where the server(s) 104 includes a number of server devices distributed across the network 114 and located in different physical locations. The server(s) 104 comprise a content server, an application server, a communication server, a web-hosting server, a multidimensional server, or a machine learning server. The server(s) 104 further access and utilize the database 112 to store and retrieve information such as a generative inpainting neural network (e.g., the class-specific cascaded modulation inpainting neural networks 116a-116n), stored sample digital images for training, and/or generated inpainted digital images.

As further shown in FIG. 1, the server(s) 104 also includes the class-specific image inpainting system 102 as part of a digital content editing system 106. For example, in one or more implementations, the digital content editing system 106 is able to store, generate, modify, edit, enhance, provide, distribute, and/or share digital content, such as digital images. For example, the digital content editing system 106 provides tools for the client device 108, via the client application 110, to generate and modify digital images.

In one or more embodiments, the server(s) 104 includes all, or a portion of, the class-specific image inpainting system 102. For example, the class-specific image inpainting system 102 operates on the server(s) to train a generative inpainted neural network to generate inpainted digital images. In some cases, the class-specific image inpainting system 102 utilizes, locally on the server(s) 104 or from another network location (e.g., the database 112), a class-specific cascaded modulation inpainting neural network including one or more constituent neural networks such as an encoder neural network, a generator neural network, and/or a discriminator neural network.

In certain cases, the client device 108 includes all or part of the class-specific image inpainting system 102. For example, the client device 108 generates, obtains (e.g., download), or utilizes one or more aspects of the class-specific image inpainting system 102, such as the class-specific cascaded modulation inpainting neural networks 116a-116n, from the server(s) 104. Indeed, in some implementations, as illustrated in FIG. 1, the class-specific image inpainting system 102 is located in whole or in part on the client device 108. For example, the class-specific image inpainting system 102 includes a web hosting application that allows the client device 108 to interact with the server(s) 104. To illustrate, in one or more implementations, the client device 108 accesses a web page supported and/or hosted by the server(s) 104.

In one or more embodiments, the client device 108 and the server(s) 104 work together to implement the class-specific image inpainting system 102. For example, in some embodiments, the server(s) 104 train one or more neural networks discussed herein and provide the one or more neural networks to the client device 108 for implementation (e.g., to generate inpainted digital images at the client device 108). In some embodiments, the server(s) 104 train one or more neural networks, the client device 108 requests an inpainted digital image, the server(s) 104 generate an inpainted digital image utilizing the one or more neural networks and provide the inpainted digital image to the client device 108. Furthermore, in some implementations, the client device 108 assists in training one or more neural networks.

Although FIG. 1 illustrates a particular arrangement of the environment, in some embodiments, the environment has a different arrangement of components and/or may have a different number or set of components altogether. For instance, as mentioned, the class-specific image inpainting system 102 is implemented by (e.g., located entirely or in part on) the client device 108. In addition, in one or more embodiments, the client device 108 communicates directly with the class-specific image inpainting system 102, bypassing the network 114. Further, in some embodiments, the class-specific cascaded modulation inpainting neural networks 116a-116n is stored in the database 112, maintained by the server(s) 104, the client device 108, or a third-party device.

As mentioned, in one or more embodiments, the class-specific image inpainting system 102 utilizes a class-specific cascaded modulation inpainting neural network to generate inpainted digital images. For example, FIG. 2 illustrates the class-specific image inpainting system 102 generating an inpainted digital image 208 from a digital image 202 with a replacement region 204 utilizing one or more of the class-specific cascaded modulation inpainting neural networks 116a-116n, in accordance with one or more embodiments.

Figure 2:
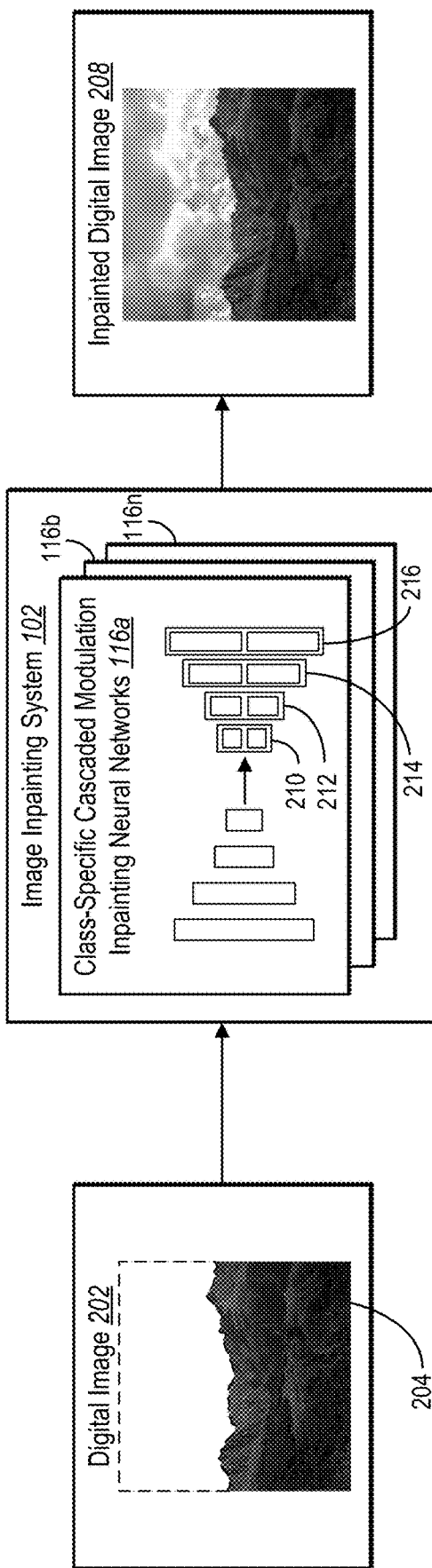
FIG. 2 illustrates an overview of utilizing a class-specific cascaded modulation inpainting neural network to generate an inpainted digital image in accordance with one or more embodiments.

As shown in FIG. 2, the class-specific image inpainting system 102 identifies the digital image 202 with a replacement region 204. In one or more embodiments, the class-specific image inpainting system 102 identifies the digital image 202 based on one or more user interactions at a client device. For example, a client device can select a digital image (e.g., from a repository of digital images stored at the client device or a remote server). Moreover, the class-specific image inpainting system 102 can receive an indication of a selection of a region of the digital image to replace, inpaint, or fill.

For example, the replacement region 204 can include an area, portion, mask, or hole within a digital image to replace, cover, or fill with replacement pixels. In some embodiments, the class-specific image inpainting system 102 identifies the replacement region 204 based on user selection of pixels to move, remove, cover, or replace from a digital image. To illustrate, a client device can select a distracting or undesired object or region of a digital image. The class-specific image inpainting system 102 can delete or remove the distracting or undesired object or region and generate replacement pixels. In some case, the class-specific image inpainting system 102 identifies the replacement region 204 by generating a digital image mask via a segmentation model (e.g., a segmentation neural network identifying an object to move or remove).

The class-specific image inpainting system 102 can identify the replacement region 204 in a variety of ways. In some embodiments, the class-specific image inpainting system 102 applies a segmentation algorithm. To illustrate, the class-specific image inpainting system 102 applies a foreground, background, or salient object segmentation model. Similarly, in some embodiments the class-specific image inpainting system 102 applies a panoptic segmentation algorithm. In some embodiments, the class-specific image inpainting system 102 applies a user selection segmentation algorithm that segments a digital object according to positive, negative, boundary, or region inputs via a digital image. In some implementations, the class-specific image inpainting system 102 provides a variety of segmentation objects for display and receives a user selection of one of the segmentation objects as the replacement region 204.

In addition, in one or more implementations the class-specific image inpainting system 102 also receives an indication of a target object class. For example, the class-specific image inpainting system 102 receives a selection of the replacement region 204 utilizing a tool associated with the target object class (e.g., a sky-fill tool or a water-fill tool). Accordingly, in some embodiments, the class-specific image inpainting system 102 receives a selection of the replacement region 204 and the corresponding target object class via the same user interaction (e.g., a sky-replacement segmentation tool utilized to select the existing sky and indicate a desire to replace the replacement region with a new sky). In some embodiments, the class-specific image inpainting system 102 identifies a replacement region (e.g., utilizing a segmentation algorithm) and receives a separate user interaction identifying a target object class to replace the replacement region (e.g., selection of a ground target object from a plurality of target object selectable elements).

In some implementations, the class-specific image inpainting system 102 automatically determines the target object class. For example, the class-specific image inpainting system 102 can determine a classification corresponding to pixels in or around the replacement region. In one or more embodiments, the class-specific image inpainting system 102 utilizes the classification to intelligently determine the target object class. Thus, for instance, the class-specific image inpainting system 102 can determine that the replacement region 204 previously portrayed sky pixels (or surrounding pixels indicate a sky region). In response, the class-specific image inpainting system 102 can generate a new sky utilizing the class-specific cascaded modulation inpainting neural network 116a.

As shown, the class-specific image inpainting system 102 utilizes the class-specific cascaded modulation inpainting neural network 116a to generate replacement pixels for the replacement region 204. In particular, the class-specific cascaded modulation inpainting neural network 116a generates replacement pixels portraying an instance of the target object class (e.g., portrays a new sky in response to an indication of a sky target object class). In some embodiments, the term neural network refers to a machine learning model that is trained and/or tuned based on inputs to generate predictions, determine classifications, or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data. For example, a neural network includes a convolutional neural network, a recurrent neural network (e.g., an LSTM), a graph neural network, a generative adversarial neural network, or other architecture.

Relatedly, a generative adversarial neural network (or "GAN") includes a neural network that is tuned or trained via an adversarial process to generate an output digital image (e.g., from an input digital image). In some cases, a generative adversarial neural network includes multiple constituent neural networks such as an encoder neural network and one or more decoder/generator neural networks. For example, an encoder neural network extracts latent code from a noise vector or from a digital image. A generator neural network (or a combination of generator neural networks) generates a modified digital image by combining extracted latent code (e.g., from the encoder neural network). During training, a discriminator neural network, in competition with the generator neural network, analyzes a generated digital image to generate an authenticity prediction by determining whether the generated digital image is real (e.g., from a set of stored digital images) or fake (e.g., not from the set of stored digital images). The discriminator neural network also causes the class-specific image inpainting system 102 to modify parameters of the encoder neural network and/or the one or more generator neural networks to eventually generate digital images that fool the discriminator neural network into indicating that a generated digital image is a real digital image.

Along these lines, a generative adversarial neural network refers to a neural network having a specific architecture or a specific purpose such as a generative inpainting neural network. For example, a generative inpainting neural network includes a generative adversarial neural network that inpaints or fills pixels of a digital image with replacement pixels. In some cases, a generative inpainting neural network inpaints a digital image by filling hole regions (indicated by digital image masks) which include pixels determine to be, or otherwise designated as, flawed, missing, or otherwise undesirable. Indeed, as mentioned above, in some embodiments a digital image mask defines a replacement region using a segmentation or a mask indicating, overlaying, covering, or outlining pixels to be removed or replaced within a digital image.

Accordingly, the class-specific cascaded modulation inpainting neural network 116a includes a generative inpainting neural network that utilizes a decoder having one or more cascaded modulation decoder layers (e.g., trained to generate replacement pixels corresponding to a target object class). Indeed, as illustrated in FIG. 2, the class-specific cascaded modulation inpainting neural network 116a includes a plurality of cascaded modulation decoder layers 210-216. For example, a cascaded modulation decoder layer includes at least two connected (e.g., cascaded) modulations blocks for modulating an input signal in generating an inpainted digital image. To illustrate, a cascaded modulation decoder layer can include a first global modulation block and a second global modulation block. Similarly, a cascaded modulation decoder layer can include a first global modulation block (that analyzes global features and utilizes a global, spatially-invariant approach) and a second spatial modulation block (that analyzes local features utilizing a spatially-varying approach). Additional detail regarding modulation blocks will be provided below (e.g., in relation to FIGS. 3, 4).

As illustrated, in one or more implementations, the class-specific image inpainting system 102 trains a plurality of class-specific cascaded modulation inpainting neural networks 116a-116n. Indeed, the class-specific image inpainting system 102 trains different class-specific cascaded modulation inpainting neural networks 116a-116n to generate inpainted digital images portraying different target object classes. For example, the first class-specific cascaded modulation inpainting neural network 116a corresponds to a sky object class, the second class-specific cascaded modulation inpainting neural network 116b corresponds to a ground object class, and a third class-specific cascaded modulation inpainting neural network 116n corresponds to a human object class. The class-specific image inpainting system 102 can also train class-specific cascaded modulation inpainting neural network corresponding to different target object classes (e.g., a water object class, an ice object class, a mountain object class, a car object class, a building/structure object class, a road object class, a tree object class, a dog object class, or a cat object class).

As shown, the class-specific image inpainting system 102 utilizes the class-specific cascaded modulation inpainting neural network 116a (and the cascaded modulation decoder layers 210-216) to generate the inpainted digital image 208. Specifically, the class-specific cascaded modulation inpainting neural network 116a generates the inpainted digital image 208 by generating replacement pixels for the replacement region 204 that correspond to the target object class. As illustrated, the replacement region 204 is now filled with replacement pixels that portray a photorealistic instance of the target object class (e.g., a sky) in place of the replacement region 204.

Figure 3:
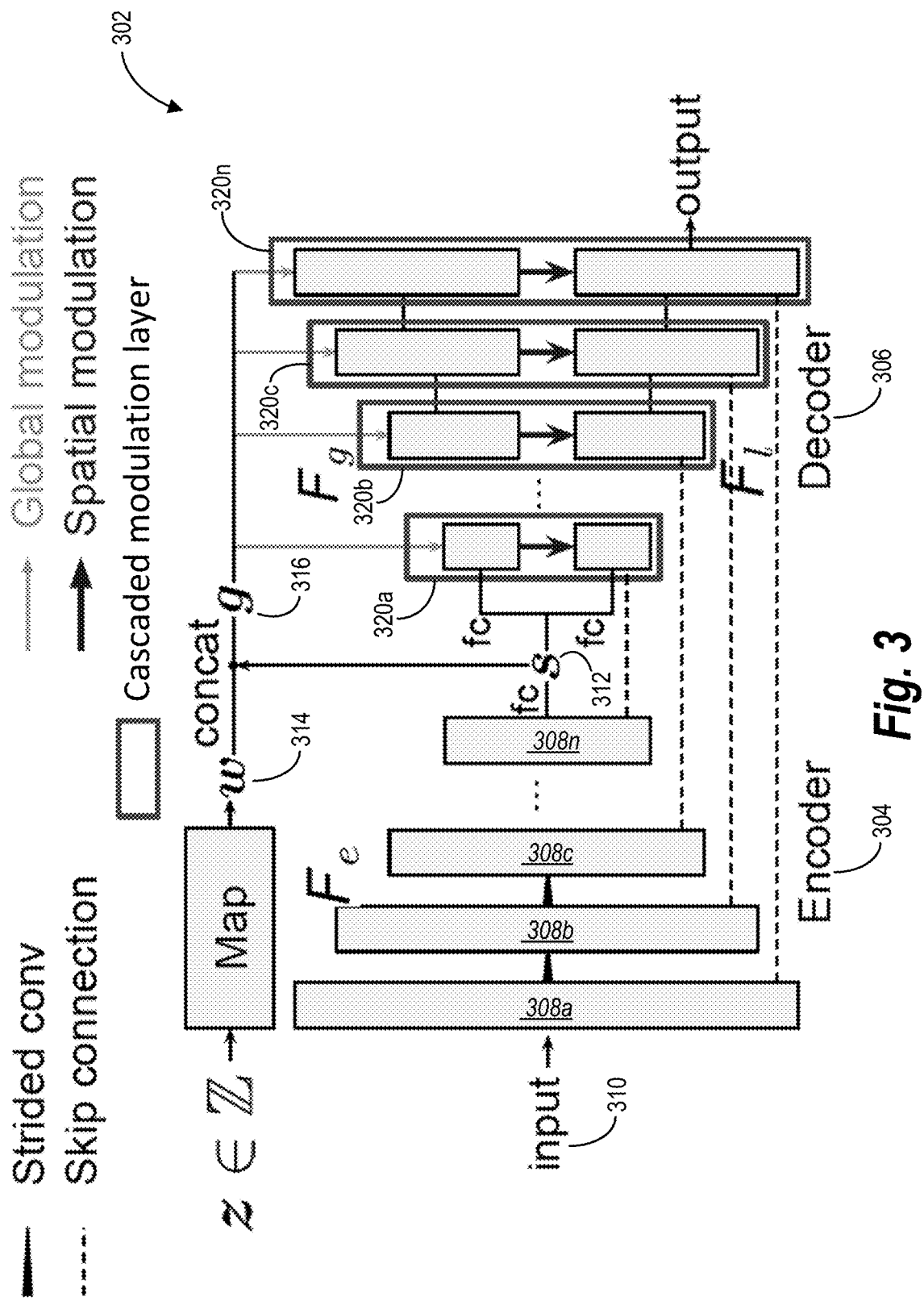
FIG. 3 illustrates an example architecture of a cascaded modulation inpainting neural network in accordance with one or more embodiments.

As mentioned above, in one or more implementations, the class-specific image inpainting system 102 utilizes a unique cascaded modulation inpainting neural network that includes cascaded modulation decoder layers to generate inpainted digital images. FIG. 3 illustrates an example architecture of a cascaded modulation inpainting neural network 302 in accordance with one or more embodiments.

As illustrated, the cascaded modulation inpainting neural network 302 includes an encoder 304 and a decoder 306. In particular, the encoder 304 includes a plurality of convolutional layers 308a-308n at different scales/resolutions. The class-specific image inpainting system 102 feeds the digital image input 310 (e.g., an encoding of the digital image) into the first convolutional layer 308a to generate an encoded feature vector at a higher scale (e.g., lower resolution). The second convolutional layer 308b processes the encoded feature vector at the higher scale (lower resolution) and generates an additional encoded feature vector (at yet another higher scale/lower resolution). The class-specific image inpainting system 102 iteratively generates these encoded feature vectors until reaching the final/highest scale convolutional layer 308n and generating a final encoded feature vector representation of the digital image.

As illustrated, in one or more embodiments, the class-specific image inpainting system 102 generates a global feature code from the final encoded feature vector of the encoder 304. A global feature code includes a feature representation of the digital image from a global (e.g., high-level, high-scale, low-resolution) perspective. In particular, a global feature code can include a representation of the digital image that reflects an encoded feature vector at the highest scale/lowest resolution (or a different encoded feature vector that satisfies a threshold scale/resolution).

As illustrated, in one or more embodiments, the class-specific image inpainting system 102 applies a neural network layer (e.g., a fully connected layer) to the final encoded feature vector to generate a style code 312 (e.g., a style vector). In addition, the class-specific image inpainting system 102 generates the global feature code by combining the style code 312 with a random style code 314. In particular, the class-specific image inpainting system 102 generates the random style code 314 by utilizing a neural network layer (e.g., a multi-layer perceptron) to process an input noise vector. The neural network layer maps the input noise vector to a random style code 314. The class-specific image inpainting system 102 combines (e.g., concatenates, adds, or multiplies) the random style code 314 with the style code 312 to generate the global feature code 316. Although FIG. 3 illustrates a particular approach to generate the global feature code 316, the class-specific image inpainting system 102 can utilize a variety of different approaches to generate a global feature code that represents encoded feature vectors of the encoder 304 (e.g., without the style code 312 and/or the random style code 314).

As mentioned above, the class-specific image inpainting system 102 can generate an image encoding utilizing the encoder 304. An image encoding refers to an encoded representation of the digital image. Thus, an image encoding can include one or more encoding feature vectors, a style code, and/or a global feature code.

In one or more embodiments, the class-specific image inpainting system 102 utilizes a plurality of Fourier convolutional encoder layer to generate an image encoding (e.g., the encoded feature vectors, the style code 312, and/or the global feature code 316). For example, a Fourier convolutional encoder layer (or a fast Fourier convolution) comprises a convolutional layer that includes non-local receptive fields and cross-scale fusion within a convolutional unit. In particular, a fast Fourier convolution can include three kinds of computations in a single operation unit: a local branch that conducts small-kernel convolution, a semi-global branch that processes spectrally stacked image patches, and a global branch that manipulates image-level spectrum. These three branches complementarily address different scales. In addition, a fast Fourier convolution can include a multi-branch aggregation process for cross-scale fusion. For example, in one or more embodiments, the class-specific image inpainting system 102 utilizes a fast Fourier convolutional layer as described by Lu Chi, Borui Jiang, and Yadong Mu in Fast fourier convolution, Advances in Neural Information Processing Systems, 33 (2020), which is incorporated by reference herein in its entirety.

Specifically, in one or more embodiments, the class-specific image inpainting system 102 utilizes Fourier convolutional encoder layers for each of the encoder convolutional layers 308a-308n. Thus, the class-specific image inpainting system 102 utilizes different Fourier convolutional encoder layers having different scales/resolutions to generate encoded feature vectors with improved, non-local receptive field.

Operation of the encoder 304 can also be described in terms of variables or equations to demonstrate functionality of the cascaded modulation inpainting neural network 302. For instance, as mentioned, the cascaded modulation inpainting neural network 302 is an encoder-decoder network with proposed cascaded modulation blocks at its decoding stage for image inpainting. Specifically, the cascaded modulation inpainting neural network 302 starts with an encoder E that takes the partial image and the mask as inputs to produce multi-scale feature maps from input resolution to resolution 4×4:

$$F_e^{(1)}, \ldots, F_e^{(L)} = E(x \odot (1-m), m),$$

where $F_e^{(i)}$ are the generated feature at scale $1 \leq i \leq L$ (and L is the highest scale or resolution). The encoder is implemented by a set of stride-2 convolutions with residual connection.

After generating the highest scale feature $F_e^{(L)}$, a fully connected layer followed by a $\ell_2$ normalization products a global style code $s = fc(F_e^{(L)})/\|fc(F_e^{(L)})\|_2$ to represent the input globally. In parallel to the encoder, an MLP-based mapping network produces a random style code w from a normalized random Gaussian noise z, simulating the stochasticity of the generation process. Moreover, the class-specific image inpainting system 102 joins w with s to produce the final global code g=[s; w] for decoding. As mentioned, the class-specific image inpainting system 102 can utilize the final global code as an image encoding for the digital image.

As mentioned above, in some implementations, full convolutional models suffer from slow growth of effective receptive field, especially at the early stage of the network. Accordingly, utilizing strided convolution within the encoder can generate invalid features inside the hole region, making the feature correction at decoding stage more challenging. Fast Fourier convolution (FFC) can assist early layers to achieve receptive field that covers an entire image. Conventional systems, however, have only utilized FFC at a bottleneck layer, which is computationally demanding. Moreover, the shallow bottleneck layer cannot capture global semantic features effectively. Accordingly, in one or more implementations the class-specific image inpainting system 102 replaces the convolutional block in the encoder with FFC for the encoder layers. FFC enables the encoder to propagate features at early stage and thus address the issue of generating invalid features inside the hole, which helps improve the results.

As further shown in FIG. 3, the cascaded modulation inpainting neural network 302 also includes the decoder 306. As shown, the decoder 306 includes a plurality of cascaded modulation layers 320a-320n. The cascaded modulation layers 320a-320n process input features (e.g., input global feature maps and input local feature maps) to generate new features (e.g., new global feature maps and new local feature maps). In particular, each of the cascaded modulation layers 320a-320n operate at a different scale/resolution. Thus, the first cascaded modulation layer 320a takes input features at a first resolution/scale and generates new features at a lower scale/higher resolution (e.g., via upsampling as part of one or more modulation operations). Similarly, additional cascaded modulation layers operate at further lower scales/higher resolutions until generating the inpainted digital image at an output scale/resolution (e.g., the lowest scale/highest resolution).

Moreover, each of the cascaded modulation layers include multiple modulation blocks. For example, with regard to FIG. 3 the first cascaded modulation layer 320a includes a global modulation block and a spatial modulation block. In particular, the class-specific image inpainting system 102 performs a global modulation with regard to input features of the global modulation block. Moreover, the class-specific image inpainting system 102 performs a spatial modulation with regard to input features of the spatial modulation block. By performing both a global modulation and spatial modulation within each cascaded modulation layer, the class-specific image inpainting system 102 refines global positions to generate more accurate inpainted digital images.

As illustrated, the cascaded modulation layers 3320a-320n are cascaded in that the global modulation block feeds into the spatial modulation block. Specifically, the class-specific image inpainting system 102 performs the spatial modulation at the spatial modulation block based on features generated at the global modulation block. To illustrate, in one or more embodiments the class-specific image inpainting system 102 utilizes the global modulation block to generate an intermediate feature. The class-specific image inpainting system 102 then utilizes a convolutional layer (e.g., a 2-layer convolutional affine parameter network) to convert the intermediate feature to a spatial tensor. The class-specific image inpainting system 102 then utilizes the spatial tensor to modulate the input features analyzed by the spatial modulation block.

Figure 4:
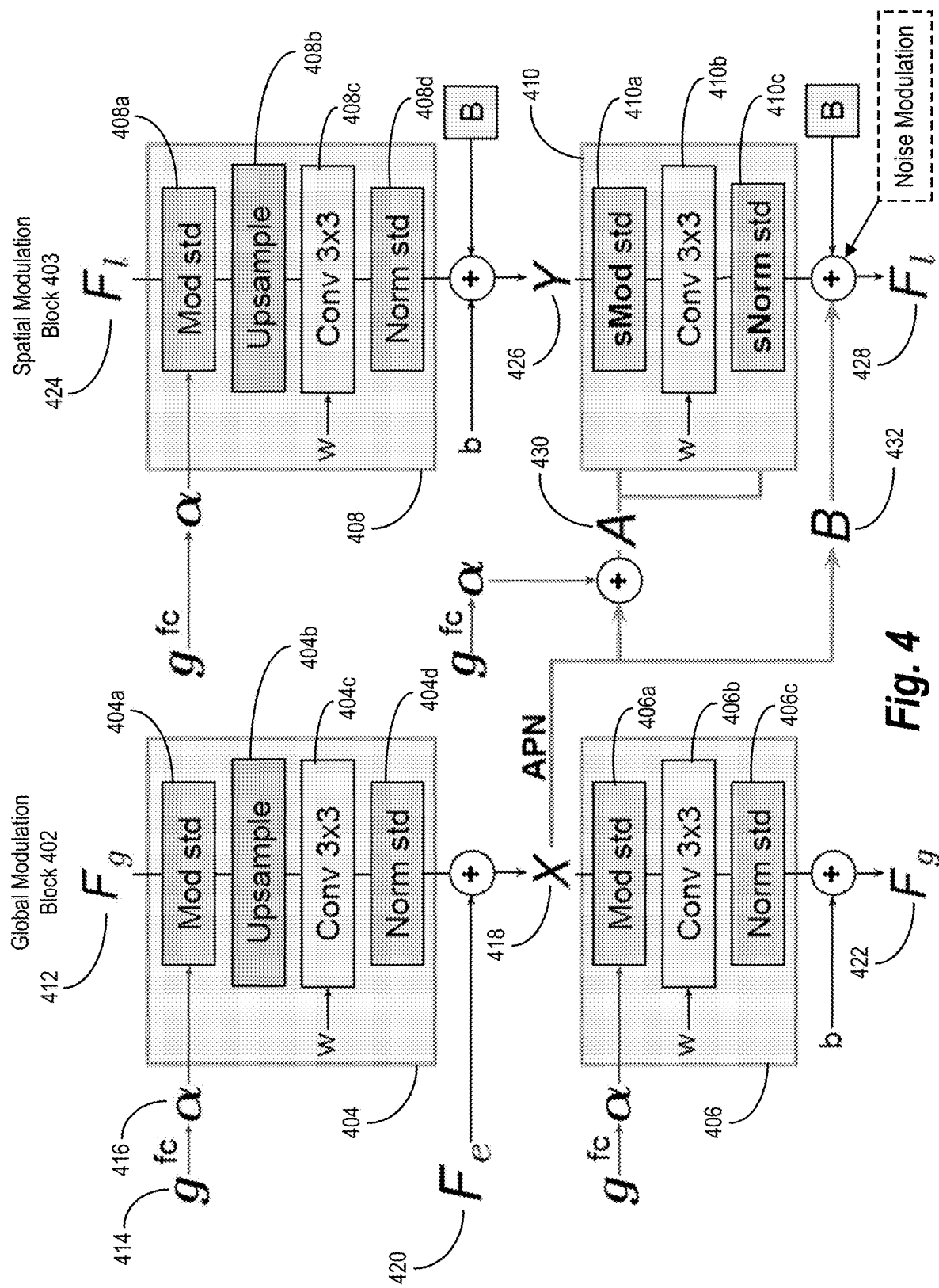
FIG. 4 illustrates an example architecture of a cascaded modulation layer of a decoder of a cascaded modulation inpainting neural network in accordance with one or more embodiments.

For example, FIG. 4 provides additional detail regarding operation of global modulation blocks and spatial modulation blocks in accordance with one or more embodiments. Specifically, FIG. 4 illustrates a global modulation block 402 and a spatial modulation block 403. As shown in FIG. 4, the global modulation block 402 includes a first global modulation operation 404 and a second global modulation operation 406. Moreover, the spatial modulation block 403 includes a global modulation operation 408 and a spatial modulation operation 410.

For example, a modulation block (or modulation operation) includes a computer-implemented process for modulating (e.g., scaling or shifting) an input signal according to one or more conditions. To illustrate, modulation block includes amplifying certain features while counteracting/normalizing these amplifications to preserve operation within a generative model. Thus, for example, a modulation block (or modulation operation) can include a modulation layer, a convolutional layer, and a normalization layer. The modulation layer scales each input feature of the convolution, and the normalization removes the effect of scaling from the statistics of the convolution's output feature maps.

Indeed, because a modulation layer modifies feature statistics, a modulation block (or modulation operation) often includes one or more approaches for addressing these statistical changes. For example, a modulation block (or modulation operation) can include a computer-implemented process that utilizes batch normalization or instance normalization to normalize a feature. The modulation is achieved by scaling and shifting the normalized activation according to affine parameters predicted from input conditions. Similarly, some modulation procedures replace feature normalization with a demodulation process. Thus, a modulation block (or modulation operation) can include a modulation layer, convolutional layer, and a demodulation layer. For example, in one or more embodiments, a modulation block (or modulation operation) includes the modulation approaches described in StyleGan2. A modulation block can include one or more modulation operations.

Moreover, global modulation block (or global modulation operation) refers to a modulation block (or modulation operation) that modulates an input signal in a spatially-invariant manner. For example, a global modulation block (or global modulation operation) performs a modulation according to global features of a digital image (e.g., that do not vary spatially across coordinates of a feature map or image). Thus, for example, a global modulation block includes a modulation block that modulates an input signal according to an image encoding (e.g., global feature code) generated by an encoder. A global modulation block can include multiple global modulation operations.

A spatial modulation block (or spatial modulation operation) refers to a modulation block (or modulation operation) that modulates an input signal in a spatially-varying manner (e.g., according to a spatially-varying feature map). In particular, a spatial modulation block (or spatial modulation operation) can utilize a spatial tensor, to modulate an input signal in a spatially-varying manner. Thus, in one or more embodiments a global modulation block applies a global modulation where affine parameters are uniform across spatial coordinates. A spatial modulation block applies a spatially-varying affine transformation that varies across spatial coordinates. In some embodiments, a spatial modulation block can include both a spatial modulation operation in combination with another modulation operation (e.g., a global modulation operation and a spatial modulation operation).

For instance, a spatial modulation operation can include spatially-adaptive modulation as described by Taesung Park, Ming-Yu Liu, Ting-Chun Wang, and Jun-Yan Zhu in Semantic image synthesis with spatially-adaptive normalization, Proceedings of the IEEE Conference on Computer Vision and Pattern Recognition (2019), which is incorporated by reference herein in its entirety (hereinafter Taesung). In some embodiments, the spatial modulation operation utilizes a spatial modulation operation with a different architecture than Taesung, including a modulation-convolution-demodulation pipeline, as described in greater detail below.

Thus, with regard to FIG. 4, the class-specific image inpainting system 102 utilizes a global modulation block 402. As shown, the global modulation block 402 includes a first global modulation operation 404 and a second global modulation operation 406. Specifically, the first global modulation operation 404 processes an input global feature map 412. For example, the input global feature map 412 includes a feature vector generated by the cascaded modulation inpainting neural network reflecting global features (e.g., high-level features or features corresponding to the whole digital image). Thus, for example, the global feature map 412 includes a feature vector reflecting global features generated from a previous global modulation block of a cascaded decoder layer. The global feature map 412 can also include a feature vector corresponding to the encoded feature vectors generated by the encoder (e.g., at a first decoder layer the class-specific image inpainting system 102 can utilize an encoded feature vector, style code, global feature code, constant, noise vector, or other feature vector as input).

As shown, the first global modulation operation 404 includes a modulation layer 404a, an upsampling layer 404b, a convolutional layer 404c, and a normalization layer 404d. In particular, the class-specific image inpainting system 102 utilizes the modulation layer 404a to perform a global modulation of the initial global feature map 412 based on a global feature code 414 (e.g., the global feature code 316). Specifically, the class-specific image inpainting system 102 applies a neural network layer (i.e., a fully connected layer) to the global feature code 414 to generate a global feature vector 416. The class-specific image inpainting system 102 then modulates the initial global feature map 412 utilizing the global feature vector 416.

In addition, the class-specific image inpainting system 102 applies the upsampling layer 404b (e.g., to modify the resolution scale). Further, the class-specific image inpainting system 102 applies the convolutional layer 404c. In addition, the class-specific image inpainting system 102 applies the normalization layer 404d to complete the first global modulation operation 404. As shown, the first global modulation operation 404 generates a global intermediate feature 418. In particular, in one or more embodiments, the class-specific image inpainting system 102 generates the global intermediate feature 418 by combining (e.g., concatenating) the output of the first global modulation operation 404 with an encoded feature vector 420 (e.g., from a convolutional layer of the encoder having a matching scale/resolution).

As illustrated, the class-specific image inpainting system 102 also utilizes a second global modulation operation 406. In particular, the class-specific image inpainting system 102 applies the second global modulation operation 406 to the global intermediate feature 418 to generate a new global feature map 422. Specifically, the class-specific image inpainting system 102 applies a global modulation layer 406a to the global intermediate feature 418 (e.g., conditioned on the global feature vector 416). Moreover, the class-specific image inpainting system 102 applies a convolutional layer 406b, and a normalization layer 406c to generate a new global feature map 422. As shown, in some embodiments, the class-specific image inpainting system 102 applies a spatial bias in generating the new global feature map 422.

Furthermore, as shown in FIG. 4, the class-specific image inpainting system 102 utilizes a spatial modulation block 403. In particular, the spatial modulation block 403 includes a global modulation operation 408 and a spatial modulation operation 410. The global modulation operation 408 processes an input local feature map 424. For example, the input local feature map 424 includes a feature vector generated by the cascaded modulation inpainting neural network reflecting local features (e.g., low-level, specific, or spatially variant features). Thus, for example, the local feature map 424 includes a feature vector reflecting local features generated from a previous spatial modulation block of a cascaded decoder layer. The global feature map 412 can also include a feature vector corresponding to the encoded feature vectors generated by the encoder (e.g., at a first decoder layer the class-specific image inpainting system 102 can utilize an encoded feature vector, style code, noise vector or other feature vector).

As shown, the class-specific image inpainting system 102 utilizes the global modulation operation 408 to generate a local intermediate feature 426 from the local feature map 424. Specifically, the class-specific image inpainting system 102 applies a modulation layer 408a, an upsampling layer 408b, a convolutional layer 408c, and a normalization layer 408d. Moreover, in one or more embodiments, the class-specific image inpainting system 102 applies spatial bias and broadcast noise to the output of the global modulation operation 408 to generate the local intermediate feature 426.

As illustrated in FIG. 4, the class-specific image inpainting system 102 utilizes the spatial modulation operation 410 to generate a new local feature map 428. Indeed, the spatial modulation operation 410 modulates the local intermediate feature 426 based on the global intermediate feature 418. Specifically, the class-specific image inpainting system 102 generates a spatial tensor 430 from the global intermediate feature 418. For example, the class-specific image inpainting system 102 applies a convolutional affine parameter network to generate the spatial tensor 430. In particular, the class-specific image inpainting system 102 applies a convolutional affine parameter network to generate an intermediate spatial tensor. The class-specific image inpainting system 102 combines the intermediate spatial tensor with the global feature vector 416 to generate the spatial tensor 430. The class-specific image inpainting system 102 utilizes the spatial tensor 430 to modulate the local intermediate feature 426 (utilizing the spatial modulation layer 410a) and generated a modulated tensor.

As shown, the class-specific image inpainting system 102 also applies a convolutional layer 410b to the modulated tensor. In particular, the convolutional layer 410b generates a convolved feature representation from the modulated tensor. In addition, the class-specific image inpainting system 102 applies a normalization layer 410c to convolved feature representation to generate the new local feature map 428.

Although illustrated as a normalization layer 410c, in one or more embodiments, the class-specific image inpainting system 102 applies a demodulation layer. For example, the class-specific image inpainting system 102 applies a modulation-convolution-demodulation pipeline (e.g., general normalization rather than instance normalization). This approach can avoid potential artifacts (e.g., water droplet artifacts) caused by instance normalization. Indeed, a demodulation/normalization layer includes a layer that scales each output feature map by a uniform demodulation/normalization value (e.g., by a uniform standard deviation instead of instance normalization that utilizes data-dependent constant normalization based on the contents of the feature maps).

As shown in FIG. 4, in some embodiments, the class-specific image inpainting system 102 also applies a shifting tensor 432 and broadcast noise to the output of the spatial modulation operation 410. For example, the spatial modulation operation 410 generates a normalized/demodulated feature. The class-specific image inpainting system 102 also generates the shifting tensor 432 by applying the affine parameter network to the global intermediate feature 418. The class-specific image inpainting system 102 combines the normalized/demodulated feature, the shifting tensor 432, and/or the broadcast noise to generate the new local feature map 428. In one or more embodiments, as shown, the class-specific image inpainting system 102 also combines a noise modulation to generate the new local feature map 428.

Upon generating the new global feature map 422 and the new local feature map 428, the class-specific image inpainting system 102 proceeds to the next cascaded modulation layer in the decoder. For example, the class-specific image inpainting system 102 utilizes the new global feature map 422 and the new local feature map 428 as input features to an additional cascaded modulation layer at a different scale/resolution. The class-specific image inpainting system 102 then utilizes the additional cascaded modulation layer to generate additional feature maps (e.g., utilizing an additional global modulation block and an additional spatial modulation block). The class-specific image inpainting system 102 can iteratively process feature maps utilizing cascaded modulation layers until coming to a final scale/resolution to generate an inpainted digital image.

Although FIG. 4 illustrates the global modulation block 402 and the spatial modulation block 403, in some embodiments, the class-specific image inpainting system 102 utilizes a global modulation block followed by (e.g., cascaded to) another global modulation block. For example, the class-specific image inpainting system 102 replaces the spatial modulation block 403 with an additional global modulation block. In such an embodiment, the class-specific image inpainting system 102 replaces APN (and spatial tensor) and corresponding spatial modulation illustrated in FIG. 4 with a skip connection. For example, the class-specific image inpainting system 102 utilizes the global intermediate feature to perform a global modulation with regard to the local intermediate vector. Thus, the class-specific image inpainting system 102 can utilizes a first global modulation block and a second global modulation block.

As mentioned, the decoder can also be described in terms of variables and equations to illustrate operation of the cascaded modulation inpainting neural network. For example, as discussed, the decoder stacks a sequence of cascaded modulation blocks to upsample the input feature map $F_e^{(L)}$. Each cascaded modulation block takes the global code g as input to modulate the feature according to the global representation of the partial image. Moreover, the class-specific image inpainting system 102 provides mechanisms to correct local error after predicting the global structure.

In particular, the class-specific image inpainting system 102 utilizes a cascaded modulation block to address the challenge of generating coherent features both globally and locally. At a high level, the class-specific image inpainting system 102 follows the following approach: i) decomposition of global and local features to separate local details from the global structure, ii) a cascade of global and spatial modulation that predicts local details from global structures. In one or more implementations, the class-specific image inpainting system 102 utilizes spatial modulations generated from the global code for better predictions (e.g., and discards instance normalization to make the design compatible with StyleGAN2).

More specifically, the cascaded modulation takes the global and local feature $F_g^{(i)}$ and $F_l^{(i)}$ from previous scale and the global code g as input and produces the new global and local features $F_g^{(i+1)}$ and $F_g^{(i+1)}$ at next scale/resolution. To produce the new global code $F_g^{(i+1)}$ from $F_g^{(i)}$, the class-specific image inpainting system 102 utilizes a global code modulation stage that includes a modulation-convolution-demodulation procedure. This generates an upsampled feature X.

Figure 5:
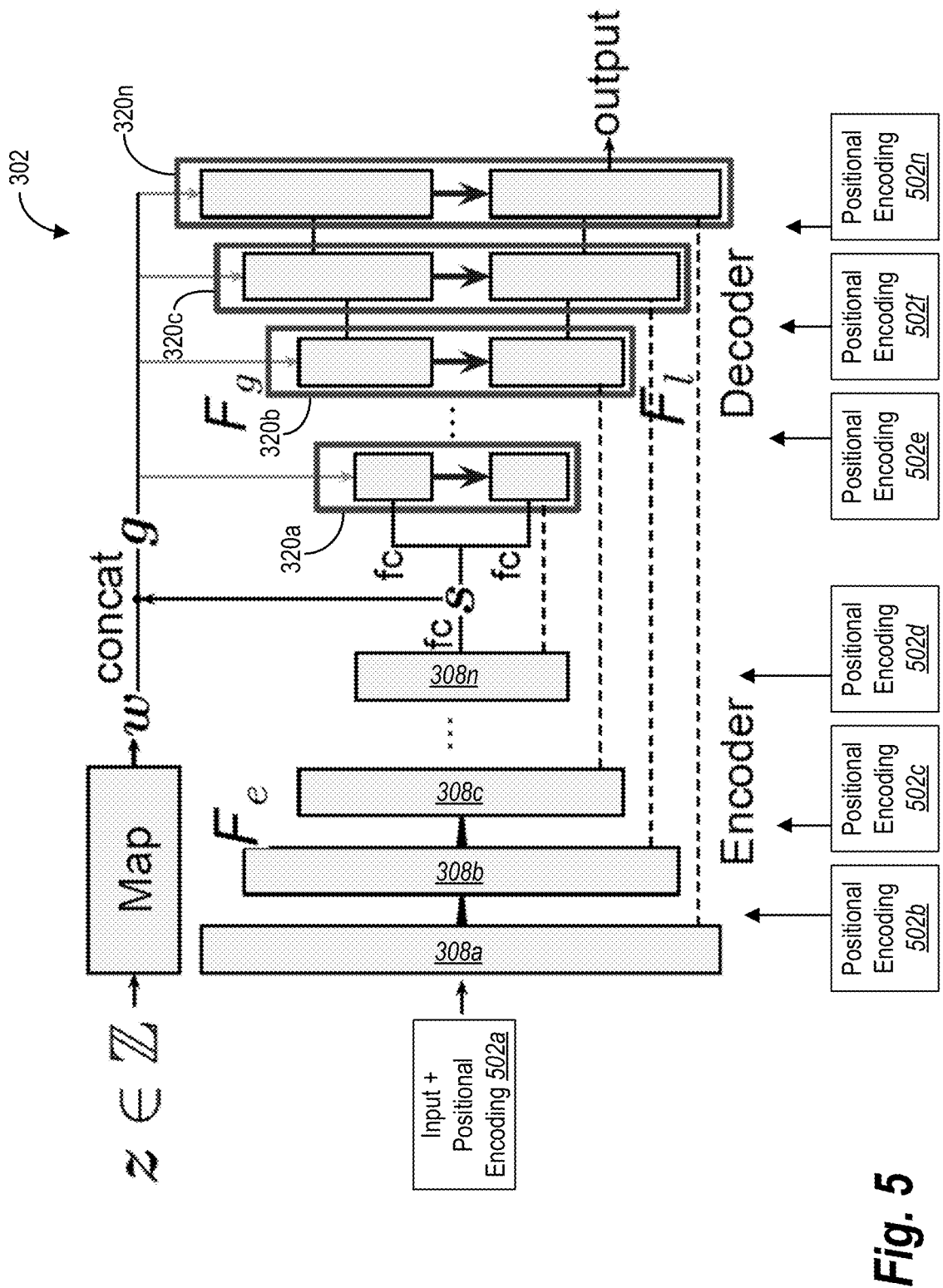
FIG. 5 illustrates an example architecture of utilizing positional encodings in a cascaded modulation inpainting neural network in accordance with one or more embodiments.

Due to the limited expressive power of the global vector g on representing 2-d visual details, and the inconsistent features inside and outside the hole, the global modulation may generate distorted features inconsistent with the context (as discussed in greater detail with regard to FIG. 5). To compensate, the class-specific image inpainting system 102 utilizes a spatial modulation that generates more accurate features. Specifically, the spatial modulation takes X as the spatial code and g as the global code to modulate the input local feature $F_g^{(i)}$ in a spatially adaptive fashion.

Moreover, the class-specific image inpainting system 102 utilizes a unique spatial modulation-demodulation mechanism to avoid potential "water droplet" artifacts caused by instance normalization in conventional systems. As shown, the spatial modulation follows a modulation-convolution-demodulation pipeline.

In particular, for spatial modulation, the class-specific image inpainting system 102 generates a spatial tensor $A_0$=APN(Y) from feature X by a 2-layer convolutional affine parameter network (APN). Meanwhile, the class-specific image inpainting system 102 generates a global vector $\alpha$=fc(g) from global gode g with a fully connected layer (fc) to capture global context. The class-specific image inpainting system 102 generates a final spatial tensor $A=A_0+\alpha$ as the broadcast summation of $A_0$ and $\alpha$ for scaling intermediate feature Y of the block with element-wise product $\odot$:

$$\bar{Y}=Y\odot A$$

Moreover, for convolution, the modulated tensor $\bar{Y}$ is convolved with a 3×3 learnable kernel K, resulting in:

$$\hat{Y}=\bar{Y}*K$$

For spatially-aware demodulation, the class-specific image inpainting system 102 applies a demodularization step to compute the normalized output $\hat{Y}$. Specifically, the class-specific image inpainting system 102 can assume that the input features Y are independent random variables with unit variance and after the modulation, the expected variance of the output is not changed, i.e., $\mathbb{E}_{y\in\hat{Y}}[Var(y)]=1$. Accordingly, this gives the demodulation computation:

$$\tilde{Y}=\hat{Y}\odot D,$$

where $D=1\sqrt{K^2\odot \mathbb{E}_{a\in A}[a^2]}$ is the demodulation coefficient. The class-specific image inpainting system 102 can implement the foregoing equation with standard tensor operations.

In one or more implementations, the class-specific image inpainting system 102 also adds spatial bias and broadcast noise. For example, the class-specific image inpainting system 102 adds the normalized feature $\tilde{Y}$ to a shifting tensor B=APN(X) produced by another affine parameter network (APN) from feature X along with the broadcast noise n to product the new local feature $F_l^{(i+1)}$:

$$F_l^{(i+1)}=\tilde{Y}+B+n$$

As mentioned above, in some embodiments, the class-specific image inpainting system 102 also modulates noise. In particular, the class-specific image inpainting system 102 samples noise ($\mathbb{R}^{1\times H\times W}$) from a normal distribution and computes a noise modulation factor strength ($\mathbb{R}^{1\times H\times W}$) via a 3×3 convolution and generates the modulated noise n'. The class-specific image inpainting system 102 then determines the local feature by adding spatial bias and noise according to:

$$F_l^{(i+1)}=\tilde{Y}+B+n'$$

For example, consider the following example pseudo code of the spatial modulation operation 410. Specifically, the affine parameters network (APN) is implemented as a 3-layer convolutional network that takes X as input to generate scaling parameters A and shifting parameters B.

```
def APN(X):
    # the 1×1 input layer
    t1=self.conv1_1×1(X)
    # the 3×3+1×1 middle layer
    t2=self.conv2_3×3(t1)
    t2=t2+self.conv2_1×1(t1)
    # the 1×1 output layer
    A=self.conv_A_1×1(t)
    B=self.conv_B_1×1(t)
    return A, B
```

Next, the spatial modulation takes feature maps X, Y and global code g as inputs to modulate Y:

```
import torch.nn.functional as F
def spatial_mod(X, Y, g, w, noise):
    bs=X.size(0) # batch size
    # get spatial code
    A, B=self.APN(X)
    # merge with global code
    A=A+self.fc(g).reshape(bs,-1,1,1)
    # spatial modulation
    Y=Y.mul(A)
    # conv
    Y=F.conv2d(Y, w)
    # spatial-aware normalization
    w=w.unsqueeze(0)
    A_avg_var=A.square( ).mean([2,3])
    reshape(bs,1,-1,1,1)
    D=(w.square( ).mul(A_avg_var)
    .sum(dim=[2,3,4])+1e-8)
    ).rsqrt( )
    Y=Y.mul(D.reshape(bs, -1, 1, 1))
    # add bias and noise
    Y=Y+B+noise
    return Y
```

In one or more embodiments, the class-specific image inpainting system 102 utilizes the neural network as described in DIGITAL IMAGE INPAINTING UTILIZING A CASCADED MODULATION INPAINTING NEURAL NETWORK, application Ser. No. 17/661,985, filed on May 4, 2022, which is incorporated herein by reference.

As mentioned above, in one or more embodiments the class-specific image inpainting system 102 also utilizes positional encodings to enhance structural predictions. For example, FIG. 5 illustrates generating and utilizing positional encodings in accordance with one or more embodiments. Specifically, FIG. 5 illustrates inserting positional encodings 502a-502n into various layers of the cascaded modulation inpainting neural network 302.

Positional encodings include a digital representation of location or position of items in a sequence. In particular, positional encodings include a finite dimensional representation (e.g., a vector or tensor) of the location of items in a sequence. Thus, a model can utilize a positional encoding to determine the location or position of a value in a sequence. Accordingly, in one or more implementations, a positional encoding is the same dimension as the sequence at issue. For example, a positional encoding has dimension matching a resolution/dimension of a feature vector or feature map (e.g., global feature map or local feature map). To address varying length and scale issues, in one or more embodiments, the class-specific image inpainting system 102 utilizes a positional encoding that includes a matrix or other digital representation of finite length/dimensionality and fixed range of values (e.g., between a pre-determined set of values).

In one or more implementations, the class-specific image inpainting system 102 utilizes Fourier features as positional encodings. For example, the class-specific image inpainting system 102 utilizes the following Fourier features for a positional encoding of an entry (e.g., an entry in a feature map):

$$PE=[\sin(\omega_0 i), \cos(\omega_0 i), \ldots, \sin(\omega_0 j), \cos(\omega_0 j), \ldots,]$$

$$\omega_0 = 1/\text{size}$$

$$\omega_1 = 2/\text{size}$$

$$\omega_2 = 3/\text{size}$$

$$\omega_n = 1$$

where i is the discrete horizontal position in a sequence (e.g., in a feature map), j is the discrete vertical position in a sequence (e.g., in a feature map), and ω is a varying frequency (from 1/size to 1) utilized to encode the position, and n is the dimensionality of the positional encoding (and corresponding feature map). Thus, the $\sin(\omega_0 i), \cos(\omega_0 i), \ldots$, component reflects the height dimension of an entry of a feature map while $\sin(\omega_0 j), \cos(\omega_0 j), \ldots$, component refers to the width dimension of an entry of a feature map. As mentioned above, in one or more implementations the total dimensionality of a positional encoding matches the resolution/dimensionality of the corresponding sequence (e.g., feature map). Thus, each layer of the cascaded modulation inpainting neural network 302 can utilize positional encodings with a dimensionality that matches the feature vectors of that layer.

In one or more embodiments, the positional encoding equation above reflects a positional encoding for a single entry. Thus, in one or more implementations, the class-specific image inpainting system 102 generates positional encodings that include a matrix of individual positional encodings for the entries (e.g., the vectors) of a feature map. In one or more embodiments, the class-specific image inpainting system 102 combines (e.g., concatenates, adds, multiplies, etc.) individual positional encodings with individual entries (e.g., feature vectors) of a feature map.

For example, the positional encodings 502a-502b includes positional encodings for each entry corresponding to feature vectors at each corresponding layer of the network. For example, in one or more implementations, the class-specific image inpainting system 102 processes a 512× 512 set of input features utilizing the first encoder layer 308a. The class-specific image inpainting system 102 combines the input feature vector with the positional encodings 502a having a dimensionality corresponding to the first encoder layer 308a (e.g., 512×512 positional encodings).

As illustrated, the first encoder layer 308a generates a feature vector that is then analyzed by the second encoder layer 308b at a different resolution/dimensionality (e.g., 256×256). The class-specific image inpainting system 102 generates the positional encodings 502b having a dimensionality corresponding to the second encoder layer 308b. Moreover, the class-specific image inpainting system 102 combines the positional encodings 502b with the feature vector generated by the first encoder layer 308a. The second encoder layer 308b then processes this combined positional feature vector. Moreover, as shown, the class-specific image inpainting system 102 utilizes a similar approach to generate and utilize positional encodings 502c, 502d with additional encoder layers 308c, 308n.

Moreover, the class-specific image inpainting system 102 also generates and utilizes positional encodings for the cascaded modulation decoder layers 502e-502n. For example, the class-specific image inpainting system 102 combines the positional encodings 502e-502n with the global feature maps and local feature maps at each layer of the cascaded modulation decoder layers 502e-502n. In particular, the class-specific image inpainting system 102 generates positional encodings 502e-502n having different dimensionalities corresponding to the resolution/dimensionality of the cascaded decoder layers 320a-320n. To illustrate, in one or more embodiments, if the cascaded decoder layer 320b has a resolution/dimensionality of 8×8, the class-specific image inpainting system 102 utilizes 8×8 positional encodings for the positional encodings 502e.

In one or more implementations, the class-specific image inpainting system 102 reuses one or more of the positional encodings from the encoder layers for the decoder layers. For example, the class-specific image inpainting system 102 utilizes the same dimensionality for the first encoder layer 308a as the last decoder layer 320n. Because they have the same dimensionality, in one or more implementations, the class-specific image inpainting system 102 utilizes the same positional encodings for the positional encodings 502a and the positional encodings 502n. In other embodiments, the class-specific image inpainting system 102 generates separate positional encodings.

As mentioned above, in one or more embodiments, the class-specific image inpainting system 102 also utilizes a unique approach to training class-specific cascaded modulation inpainting neural networks. For example, FIG. 6 illustrates an overview of the class-specific image inpainting system 102 training a class-specific cascaded modulation inpainting neural network in accordance with one or more embodiments.

Figure 6:
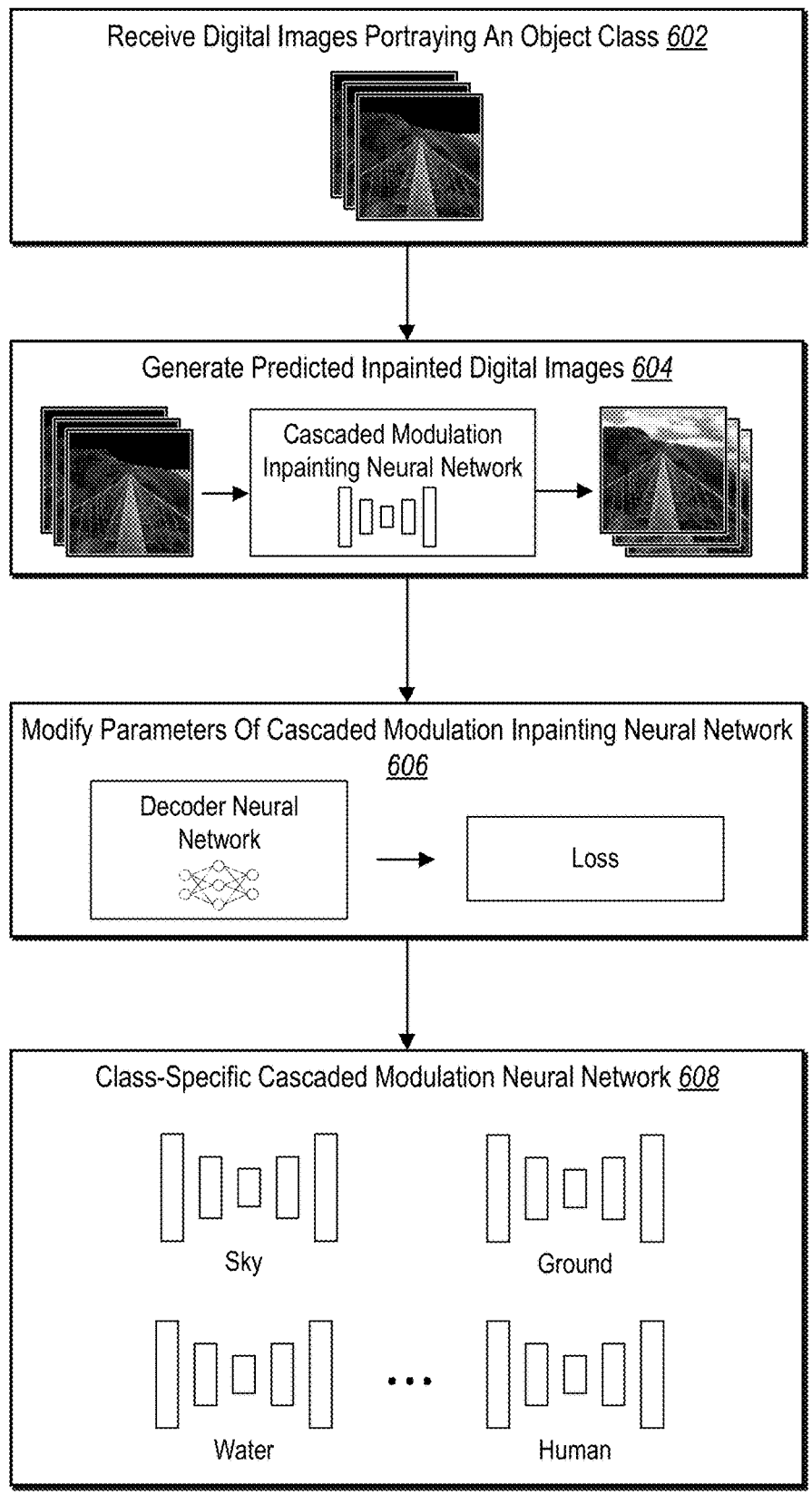
FIG. 6 illustrates an overview of training a class-specific cascaded modulation inpainting neural network in accordance with one or more embodiments.

Specifically, FIG. 6 illustrates a series of acts performed by the class-specific image inpainting system 102 in training a class-specific cascaded modulation inpainting neural network. Indeed, as shown, the class-specific image inpainting system 102 performs an act 602 of receiving digital images portraying an object class. For example, in one or more implementations, the class-specific image inpainting system 102 performs the act 602 by accessing a repository of training digital images. The class-specific image inpainting system 102 can identify the training digital images that portray an object class by utilizing a segmentation model, such as a panoptic segmentation model that identifies objects and corresponding object segmentations.

Furthermore, as illustrated in FIG. 6, the class-specific image inpainting system 102 also performs an act 606 of generating predicted inpainted digital images. For example, the class-specific image inpainting system 102 performs the act 606 by providing digital images portraying the object class to a cascaded modulation inpainting neural network and generating inpainted digital images. In some implementations, the class-specific image inpainting system 102 utilizes class-segmented digital images that block, mask, or segment instances of the object class from the digital images. For example, the class-specific image inpainting system 102 utilizes masks determined by the panoptic segmentation model to block or remove pixels portraying instances of an object class to generate class-segmented digital images. The class-specific image inpainting system 102 then utilizes the cascaded modulation inpainting neural network to generate predicted inpainted digital images from the class-segmented digital images.

As shown, the class-specific image inpainting system 102 also performs an act 606 of modifying parameters of the cascaded modulation inpainting neural network to generate a class-specific cascaded modulation inpainting neural network 608. In particular, the class-specific image inpainting system 102 utilizes the predicted inpainted digital image (from the act 604) to modify parameters of the cascaded modulation inpainting neural network. For instance, as illustrated, the class-specific image inpainting system 102 determines an adversarial loss from the inpainted digital image by utilizing a decoder neural network. To illustrate, the class-specific image inpainting system 102 utilizes the decoder neural network to generate an authenticity prediction and determines the adversarial loss from the authenticity prediction. The class-specific image inpainting system 102 then learns parameters of the cascaded modulation inpainting neural network from the adversarial loss.

As shown, by modifying the parameters of the cascaded modulation inpainting neural network in this manner, the class-specific image inpainting system 102 generates the class-specific cascaded modulation inpainting neural network 608. Indeed, by training the class-specific cascaded modulation inpainting neural network utilizing class-segmented digital images, the class-specific cascaded modulation inpainting neural network learns to generate inpainted digital images portraying a particular object class.

The class-specific image inpainting system 102 can generate a variety of different class-specific cascaded modulation inpainting neural networks. Indeed, as shown, the class-specific image inpainting system 102 can generate class-specific cascaded modulation inpainting neural networks trained to generate a sky object class, a ground object class, a water object class, and/or a human object class. The class-specific image inpainting system 102 can select the appropriate class-specific cascaded modulation inpainting neural network from a plurality of class-specific cascaded modulation inpainting neural networks in response to a particular request for an inpainted digital image. For example, if a client device identifies a replacement region with an indication of a sky object class, the class-specific image inpainting system 102 can select the class-specific cascaded modulation inpainting neural network trained to generate sky regions (e.g., from sky-specific class-segmentation digital images). Similarly, in response to a client device selecting a replacement region with an indication of a ground object class, the class-specific image inpainting system 102 can select the class-specific cascaded modulation inpainting neural network trained to generate ground regions (e.g., from ground-specific class-segmentation digital images).

Figure 7:
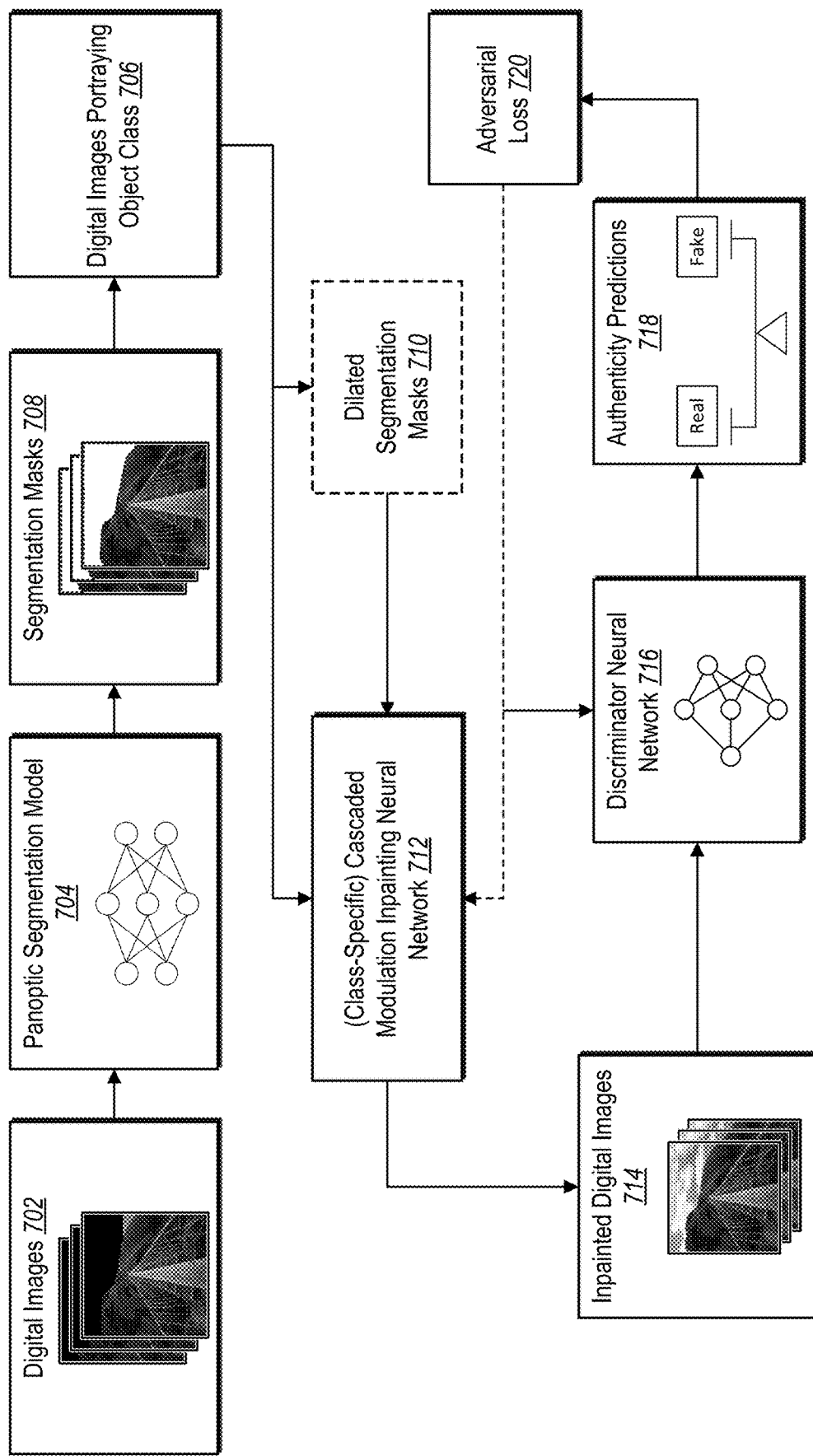
FIG. 7 illustrates a flow diagram of training a class-specific cascaded modulation inpainting neural network in accordance with one or more embodiments in accordance with one or more embodiments.

For example, FIG. 7 provides additional detail regarding the class-specific image inpainting system 102 training a class-specific cascaded modulation inpainting neural network in accordance with one or more embodiments. As shown, the class-specific image inpainting system 102 identifies digital images 702 and utilizes a panoptic segmentation model 704 to identify digital images portraying an object class 706 and segmentation masks 708. A panoptic segmentation model includes a computer-implemented model for assigning pixels in a digital image with a semantic label. For example, a panoptic segmentation model includes a machine learning model that predicts a semantic label for each pixel in a digital image, thus segmenting the digital image into semantically labeled regions. In some implementations, the class-specific image inpainting system 102 utilizes a neural network panoptic segmentation model. For example, in one or more implementations, the class-specific image inpainting system 102 utilizes a panoptic segmentation neural network as described by Y. Li, H. Zhao, X. Qi, L. Wang, Z. Li, J. Sun, and J. Jia in Full Convolutional Networks for Panoptic Segmentation, CVPR 2021, arXiv:2012.00720v2.

To illustrate, the class-specific image inpainting system 102 utilizes the panoptic segmentation model 704 to identify all digital images portraying pixels having a sky semantic label. The class-specific image inpainting system 102 utilizes these sky digital images as the digital images portraying an object class 706. Moreover, the class-specific image inpainting system 102 also identifies those pixels portraying the sky regions and generates the segmentation masks 708 from those pixels. Thus, the class-specific image inpainting system 102 generates the segmentation masks 708 to block or cover instances of the object class.

By applying the segmentation masks 708, the class-specific image inpainting system 102 generates class-segmented digital images. Specifically, the class-specific image inpainting system 102 segments the object instances from the digital images portraying the object class 706. For example, a class-segmented digital image can include a digital image and a mask that covers one or more instances of an object class portrayed in the digital image.

As shown in FIG. 7, in one or more embodiments, the class-specific image inpainting system 102 also generates and applies dilated segmentation masks 710. For example, in one or more embodiments, the class-specific image inpainting system 102 applies a dilation operation to the segmentation masks 708 to generate the dilated segmentation masks 710. For instance, a dilation operation can include a computer implemented model or process for expanding a mask or pixels of a mask. To illustrate, a dilation operation can expand a mask by a predetermined number of pixels (e.g., three pixels or five pixels) to dilate the size of the mask.

Because the segmentation masks 708 may not cover all pixels of an object class, in some embodiments the class-specific image inpainting system 102 applies the dilation operation and generates the dilated segmentation masks 710 to reduce the likelihood that class-segmented digital images will include pixels corresponding to the object class. Thus, for example, a segmentation of a sky region may leave a small perimeter of pixels portraying the sky. By applying a dilation operation, the class-specific image inpainting system 102 can segment/cover/block such a perimeter of pixels in generating class-segmented digital images.

As shown, the class-specific image inpainting system 102 utilizes a cascaded modulation inpainting neural network 712 to process the digital images portraying the object class 706 and the segment masks 708 (or the dilated segmentation masks 710). In particular, the class-specific image inpainting system 102 generates class-segmented digital images (by providing the digital images portraying the object class 706 and the segmentation masks 708 as inputs to the cascaded modulation inpainting neural network 712). As mentioned above, the cascaded modulation inpainting neural network 712 utilizes encoder layers and cascaded modulation decoder layers to generate inpainted digital images 714.

In addition, the class-specific image inpainting system 102 utilizes the inpainted digital images 714 to determine an adversarial loss 720. Specifically, the class-specific image inpainting system 102 utilizes a discriminator neural network 716. As discussed above, the discriminator neural network 716 analyzes input digital images and generates authenticity predictions. For example, the discriminator neural network 716 can take a real digital image (e.g., a digital image not generated by the cascaded modulation inpainting neural network 712) and predict whether the digital image is real or fake. In one or more embodiments, the class-specific image inpainting system 102 compares this authenticity prediction with an authenticity label (e.g., real or fake) to determine an adversarial loss. The class-specific image inpainting system 102 utilizes this adversarial loss to train the discriminator neural network.

Similarly, the class-specific image inpainting system 102 can also utilize the discriminator neural network 716 to analyze digital images generated by the cascaded modulation inpainting neural network 712. Indeed, as shown, the class-specific image inpainting system 102 utilizes the discriminator neural network 716 to generate authenticity predictions 718 from the inpainted digital images 714. The class-specific image inpainting system 102 compares the authenticity predictions 718 to authenticity labels (e.g., fake labels) for the inpainted digital images 714 to determine the adversarial loss 720.

Moreover, as shown, the class-specific image inpainting system 102 also utilizes the adversarial loss 720 to modify parameters of the cascaded modulation inpainting neural network 712 and/or the discriminator neural network 716. For example, the class-specific image inpainting system 102 utilizes gradient descent and back-propagation techniques to modify internal parameter weights across layers of the cascaded modulation inpainting neural network 712 and the discriminator neural network 716. In this manner, the discriminator neural network 716 becomes more adept at distinguishing between real and fake digital images. Moreover, the cascaded modulation inpainting neural network 712 becomes more adept at generating inpainted digital images corresponding to the object class. Accordingly, the class-specific image inpainting system 102 learns parameters such that the cascaded modulation inpainting neural network becomes the class-specific cascaded modulation inpainting neural network 712.

In one or more embodiments, the class-specific image inpainting system 102 learns parameters for a generative inpainting neural network utilizing masked regularization. To elaborate, the class-specific image inpainting system 102 utilizes a modified regularization technique such as R1 regularization that is tailored specifically for inpainting digital images. For instance, the class-specific image inpainting system 102 modifies an R1 regularization term to avoid computing penalties on a partial image and to thus impose a better separation of input conditions from generated outputs. In some cases, the class-specific image inpainting system 102 modifies R1 regularization utilizing a digital image mask to form a masked R1 regularization term. By utilizing masked regularization, in one or more embodiments, the class-specific image inpainting system 102 reduces or eliminates harmful impacts of computing regularization on a background of a digital image. In one or more embodiments, the class-specific image inpainting system 102 utilizes the training approach as described in LEARNING PARAMETERS FOR GENERATIVE INPAINTING NEURAL NETWORKS UTILIZING OBJECT-AWARE TRAINING AND MASKED REGULARIZATION, U.S. patent application Ser. No. 17/650,967, filed Feb. 14, 2022, which is incorporated by reference herein in its entirety. In one or more embodiments, the class-specific image inpainting system 102 avoids using reconstruction loss (such as perceptual loss).

Although FIGS. 2-7 illustrate utilizing cascaded modulation inpainting neural networks, the class-specific image inpainting system 102 can utilize a variety of inpainting neural networks. For example, the class-specific image inpainting system 102 can utilize the unique training approach described above with regard to a variety of inpainting neural networks referenced in this disclosure. Indeed, in some embodiments, the class-specific image inpainting system 102 trains and utilizes a class-specific inpainting neural network having encoder and decoder layers, but that do not include cascaded modulation layers. Thus, the description above regarding class-specific cascaded modulation inpainting neural networks can also be implemented with class-specific inpainting neural networks having architectures without cascaded modulation decoder layers.

In addition, although FIGS. 2-7 illustrate generating inpainted digital images for particular classes (such as sky, water, ground, etc.), these classes can also include types of objects within a particular class. Thus, for example, the class-specific image inpainting system 102 can utilize a first class-specific inpainting neural network trained to generate a cloudy sky (a first class) and a second class-specific inpainting neural network trained to generate a blue sky (a second class). Thus, the class-specific image inpainting system 102 can utilize different class-specific inpainting neural networks to generate different types of a class or different sub-classes (e.g., stormy, ember, blue, cloudy). In one or more embodiments, the class-specific image inpainting system 102 determines a particular type of a class based on a user input. For example, the class-specific image inpainting system 102 can receive a text user input (e.g., "cloudy sky") or a digital image that portrays a particular type of a class (e.g., a digital image portraying a cloudy sky) and then generate replacement pixels for an inpainted digital image that portrays the type of the class. Each of these types is included in the over-arching term "class" as used herein.

Figure 8A:
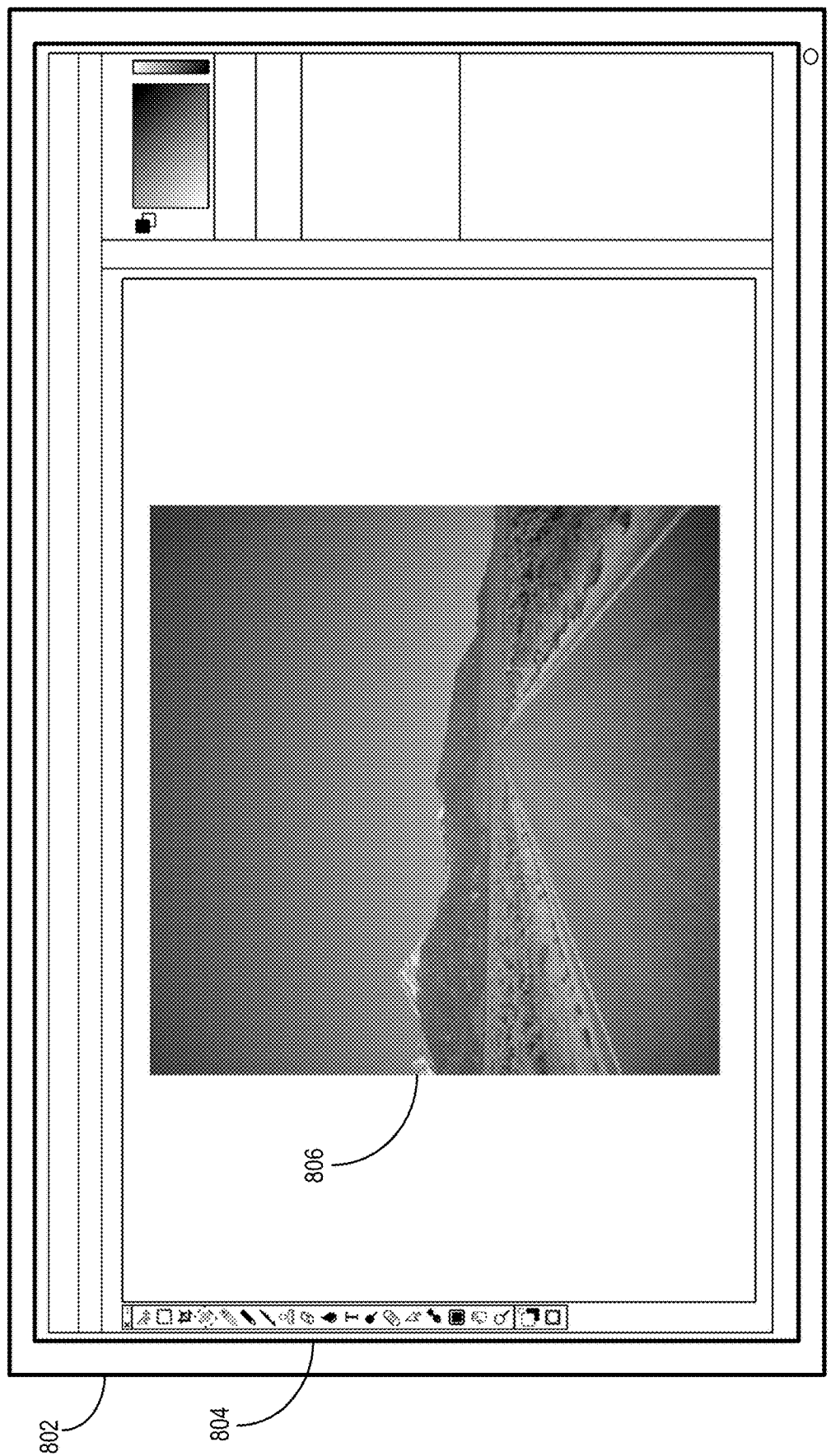
FIGS. 8A-8C illustrate user interfaces utilized to generate an inpainted digital image in accordance with one or more embodiments.

As mentioned above, in one or more embodiments the class-specific image inpainting system 102 also generates various user interfaces for generating inpainted digital images. For example, FIG. 8A illustrates a digital image 806 portrayed via a user interface 804 of a client device 802. In response to user interaction via the user interface 804, the class-specific image inpainting system 102 can identify a replacement region for the digital image.

Figure 8B:
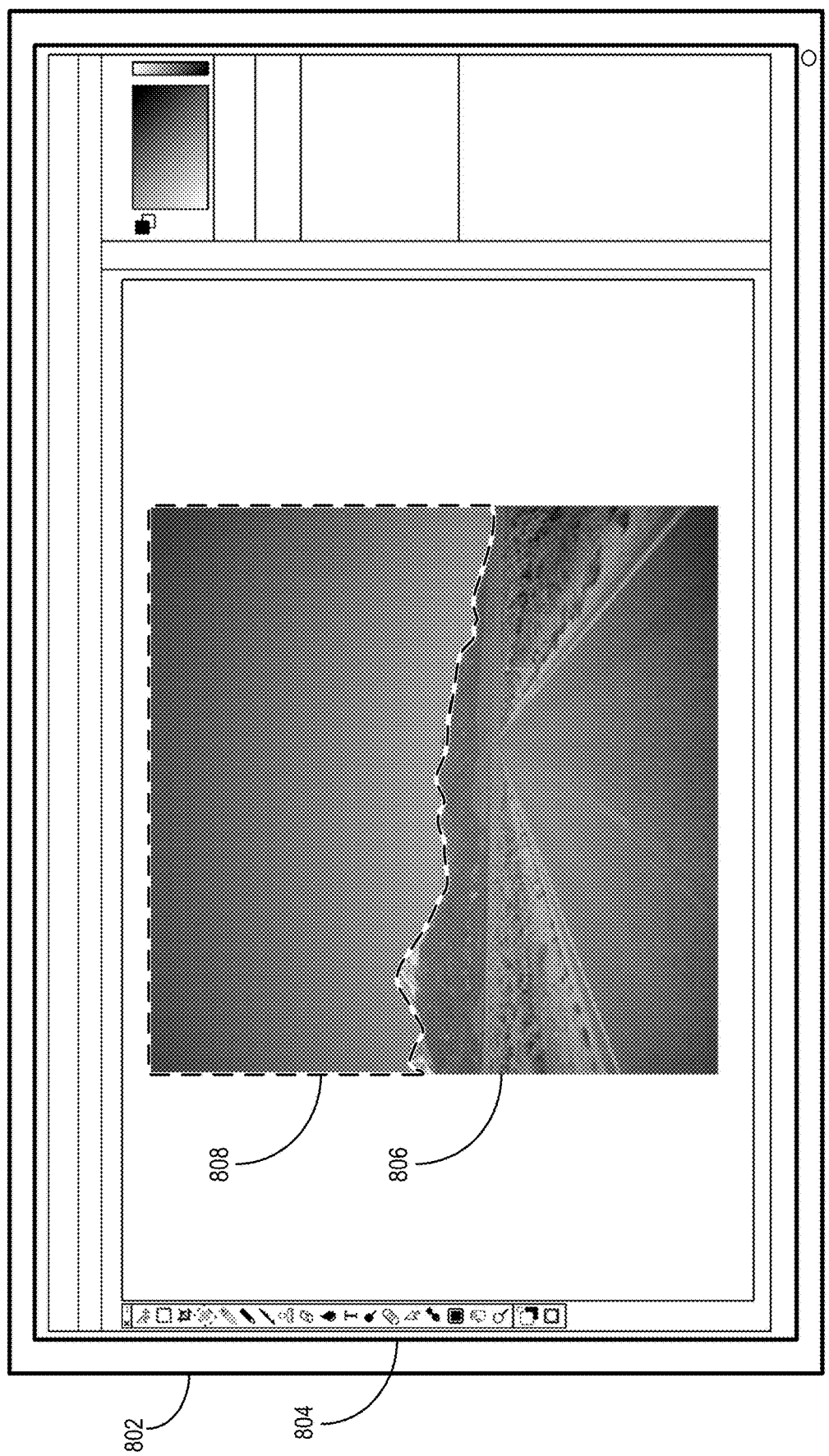

For example, FIG. 8B illustrates the user interface 804 upon identifying of a sky region of the digital image 806. In particular, the class-specific image inpainting system 102 receives a user interaction (e.g., a user selection) of the sky region 808, such as a click, press, or other selection event. In one or more embodiments, the class-specific image inpainting system 102 identifies the sky region 808 utilizing a segmentation model. For example, the class-specific image inpainting system 102 utilizes a segmentation model that identifies salient objects, that segments objects based on user selections, and/or that segments all objects in a digital image. For example, the class-specific image inpainting system 102 utilizes the model described by Ning Xu et al. in *Deep GrabCut for Object Selection*, published Jul. 14, 2017, which is hereby incorporated by reference in its entirety. Alternatively, the class-specific image inpainting system 102 utilizes one or more of the models described in: U.S. Patent Application Publication No. 2019/0130229, entitled Deep Salient Content Neural Networks for Efficient Digital Object Segmentation, filed Oct. 31, 2017; U.S. patent application Ser. No. 16/035,410, entitled Automatic Trimap Generation and Image Segmentation, filed Jul. 13, 2018; or U.S. Pat. No. 10,192,129, entitled Utilizing Interactive Deep Learning to Select Objects in Digital Visual Media, filed Nov. 18, 2015, each of which are hereby incorporated by reference in their entireties.

In this manner, the class-specific image inpainting system 102 identifies a replacement region. In one or more embodiments, the class-specific image inpainting system 102 also identifies a target object class corresponding to the replacement region. For example, the class-specific image inpainting system 102 can receive a user selection (via the user interface 804) of a particular target object class (e.g., sky, ground, water) to include in replacement pixels for the replacement region. In some embodiments, the class-specific image inpainting system 102 identifies the target object class based on selection of a target object class selection element (e.g., a button or radio button via the user interface 804). In some embodiments, the class-specific image inpainting system 102 identifies the target object class based on a selected tool. For example, the class-specific image inpainting system 102 can receive user selection of a "sky replacement tool." Upon selection of the sky replacement tool, the class-specific image inpainting system 102 can receive a selection of the sky region 808 and (because the user has already identified the sky replacement tool) the class-specific image inpainting system 102 can identify the target object class as a sky object class.

In some implementations, the class-specific image inpainting system 102 determines the target object class by analyzing the digital image and/or replacement region. For example, the class-specific image inpainting system 102 can utilize a panoptic segmentation model to analyze a digital image and determine that pixels of a replacement region correspond to a particular semantic category. The class-specific image inpainting system 102 can utilize this semantic category as the target object class. Thus, upon identifying that a replacement region portrays a sky the class-specific image inpainting system 102 can select a sky target object class. Similarly, upon identifying that a replacement region portrays a human, the class-specific image inpainting system 102 can select a human target object class.

Upon identifying the sky region 808 and the target object class, the class-specific image inpainting system 102 utilizes a class-specific inpainting neural network to generate an inpainted digital image portraying a new instance of the object class. Specifically, the class-specific image inpainting system 102 selects a class-specific inpainting neural network that corresponds to the target object class. Thus, upon determining a sky target object class, the class-specific image inpainting system 102 selects a class-specific inpainting neural network trained to generate sky regions. Similarly, upon determining a ground object class (e.g., grass, sand object classes), the class-specific image inpainting system 102 selects a class-specific inpainting neural network trained to generate ground regions.

The class-specific image inpainting system 102 also utilizes the class-specific inpainting neural network to generate an inpainted digital image. In particular, the class-specific image inpainting system 102 generates a masked digital image and provides the masked digital image to the class-specific inpainting neural network. To illustrate, the class-specific image inpainting system 102 generates a mask covering the sky region 808 and applies the mask to the digital image 806 to cover or block the sky region 808. In one or more embodiments, the class-specific image inpainting system 102 also applies a dilation operation to generate a dilated mask. Indeed, as discussed above (with regard to FIG. 7) the class-specific image inpainting system 102 can apply a dilation operation to a mask to generate a dilated mask. The class-specific image inpainting system 102 can then utilize the dilated mask to generate a masked digital image for utilization by the class-specific inpainting neural network. Indeed, the class-specific image inpainting system 102 utilizes the class-specific inpainting neural network to generate an inpainted digital image portraying a new instance of the target object.

Figure 8C:
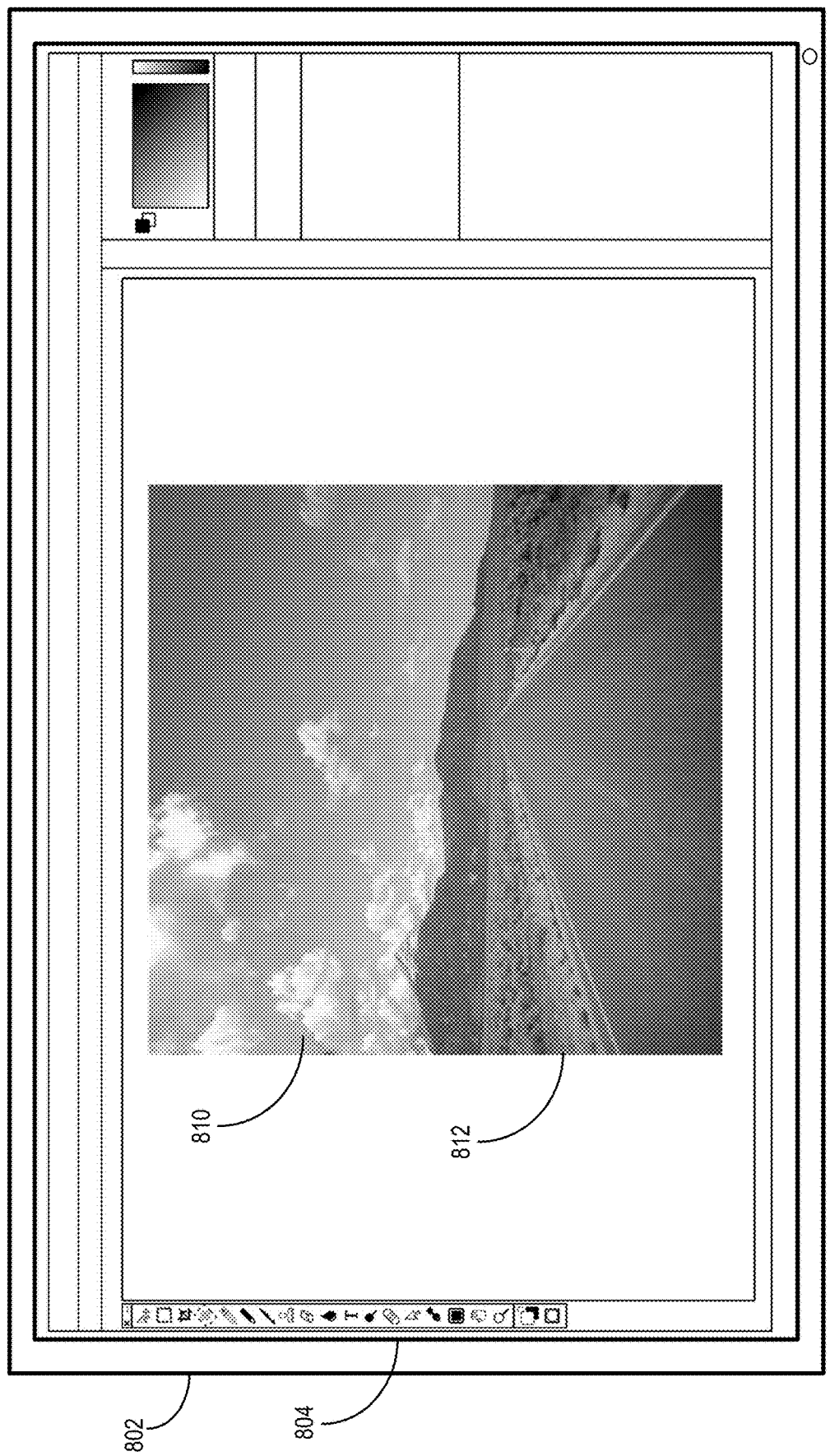

For example, FIG. 8C illustrates the user interface 804 portraying an inpainted digital image 812 with replacement pixels 810 replacing the sky region 808. As shown, the class-specific image inpainting system 102 utilizes the class-specific inpainting neural network to generate replacement pixels that portray an instance of a sky. By utilizing the class-specific inpainting neural network the class-specific image inpainting system 102 generates novel, synthesized sky region that blends with the remaining scene from the digital image 806. Moreover, the class-specific image inpainting system 102 provides the client device with flexibility to control the contents of the replacement pixels 810.

Although FIGS. 8A-8C illustrate replacement a sky region with a new sky region, the class-specific image inpainting system 102 can also generate user interfaces for adding an instance of a target object class in a replacement region that did not previously portray the target object class. For example, the class-specific image inpainting system 102 can generate a sky region in an area of a digital image where there was previously no sky. Similarly, the class-specific image inpainting system 102 can generate a water region in an area of a digital image that did not previously portray water.

Figure 9A:
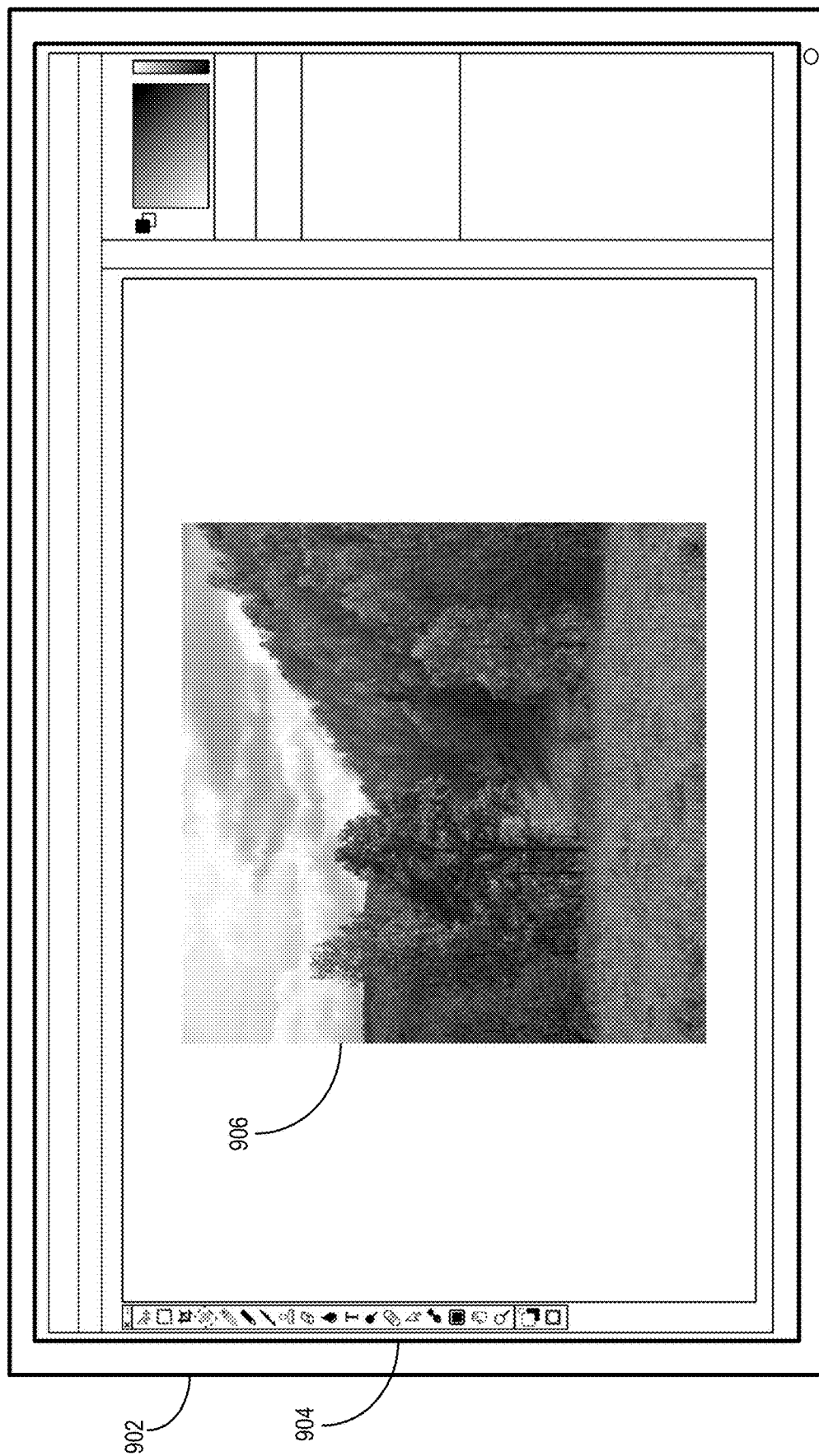
FIGS. 9A-9C illustrates additional user interfaces utilized to generate an inpainted digital image in accordance with one or more embodiments.
Figure 9B:
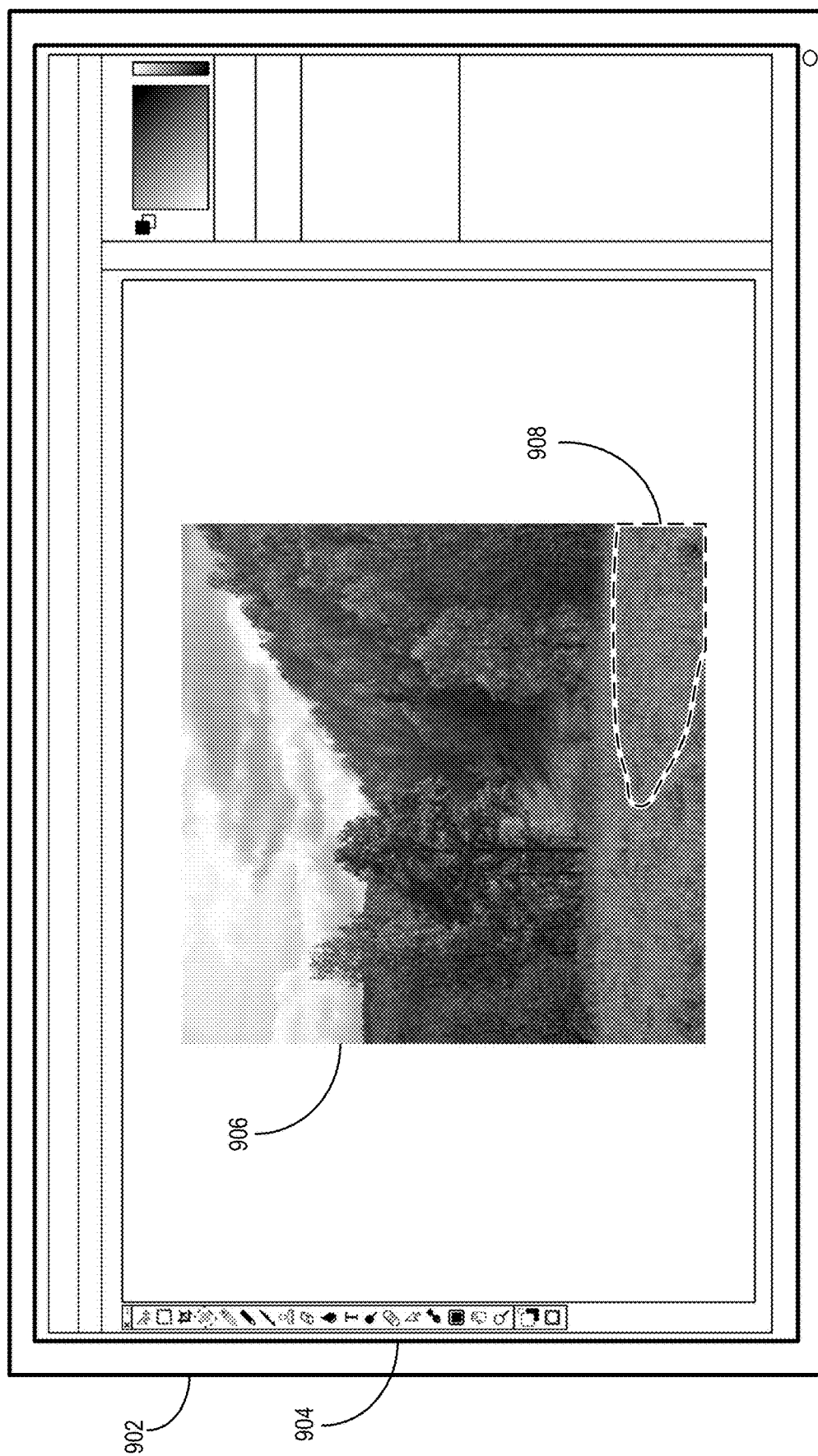

For example, FIG. 9A illustrates a digital image 906 displayed via a user interface 904 of a client device 902. The digital image 906 portrays a nature scene with a sky and mountains but does not portray any water. The class-specific image inpainting system 102 can generate an inpainted digital image that portrays novel generated pixels that portray water. For instance, as shown in FIG. 9B, the class-specific image inpainting system 102 receives a user interaction (e.g., painting or drawing) of a replacement region 908. The class-specific image inpainting system 102 also identifies a water target object class. Specifically, the class-specific image inpainting system 102 identifies the water target object class based on selection of a water replacement tool (or a selection of a different water class selection element).

Figure 9C:
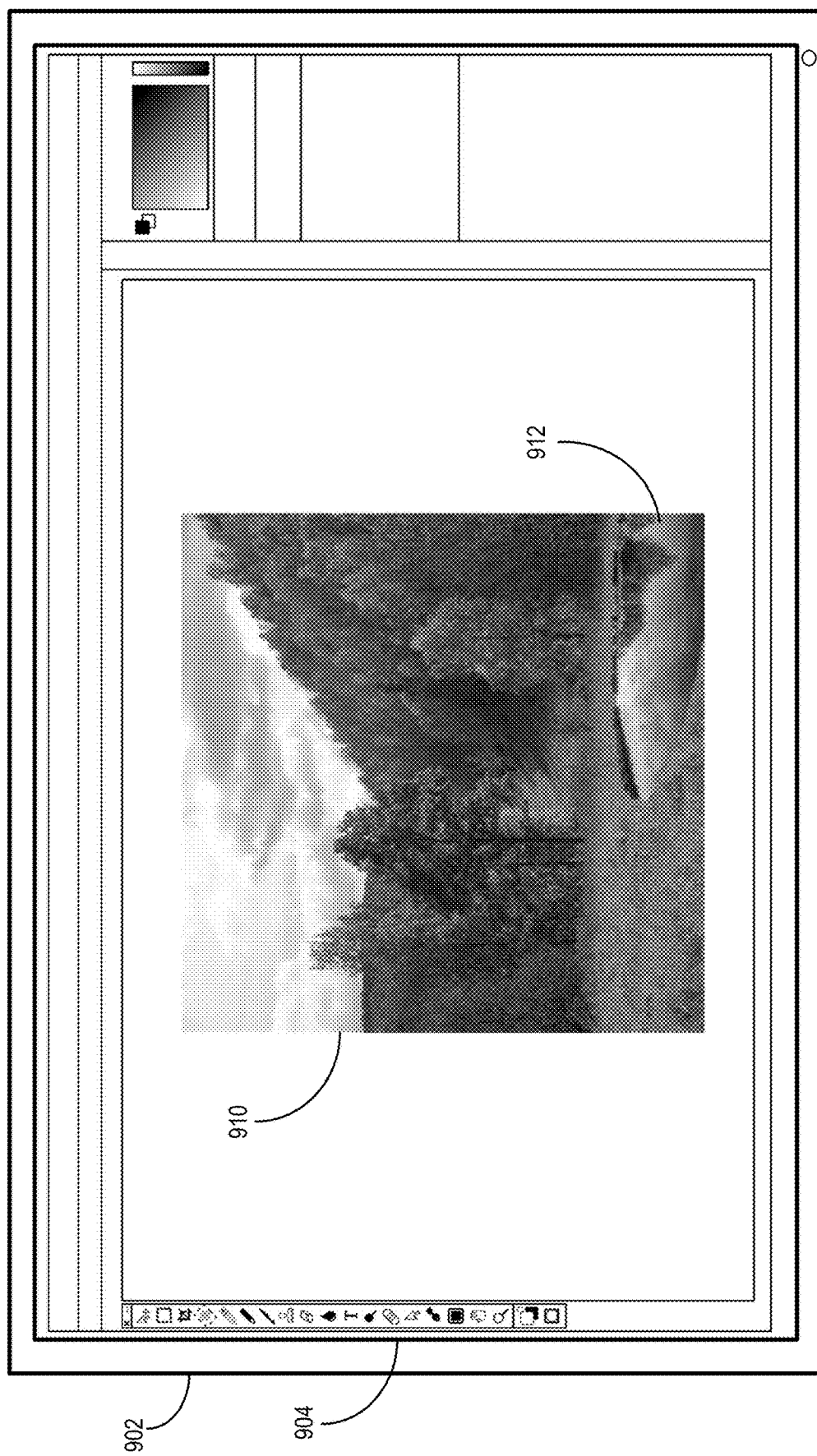

As shown in FIG. 9C, the class-specific image inpainting system 102 utilizes a class-specific inpainting neural network to generate replacement pixels 912 portraying an instance of the target object class (e.g., a lake). In particular, the class-specific inpainting neural network generates a lake that blends in with the surrounding context of the digital image, even though the digital image 906 did not portray water. Thus, the class-specific image inpainting system 102 can receive user input (e.g., brushing or area inputs) and generate replacement pixels of an inpainted digital image 910 portraying one or more novel instances of a target object class.

Figure 10:
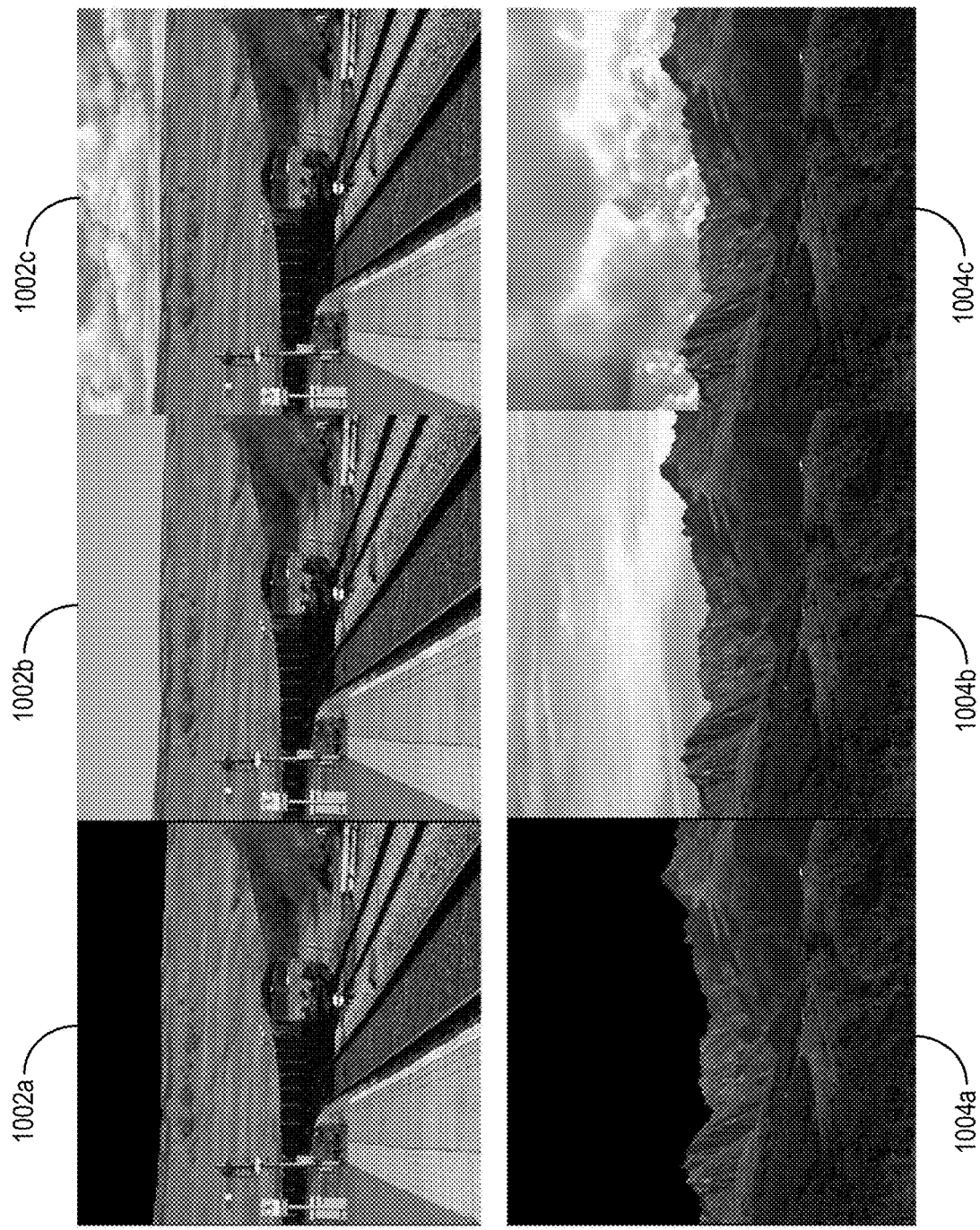
FIG. 10 illustrates example results of generating inpainted digital images utilizing a class-specific cascaded modulation inpainting neural network trained to generate sky regions for digital images in accordance with one or more embodiments.

As mentioned above, researchers have conducted experiments with the class-specific image inpainting system 102 to analyze results of utilizing an example implementation of a class-specific cascaded modulation inpainting neural network. For example, FIG. 10 illustrates example inpainted digital images generated by example implementations of the class-specific image inpainting system 102. In particular, the class-specific image inpainting system 102 generated the inpainted digital images 1002c, 1004c from the original digital images 1002b, 1004b. Specifically, the class-specific image inpainting system 102 generated masked digital images 1002a, 1004a from the original digital images 1002b, 1004b and utilized an example class-specific cascaded modulation inpainting neural network to generate the inpainted digital images 1002c, 1004c from the masked digital images 1002a, 1004a. As illustrated, the inpainted digital images 1002c, 1004c portray new, synthesized instances of a target object class that seamlessly blend with the context of the original digital images 1002b, 1004b.

Researchers have also conducted additional objective experiments to compare the class-specific image inpainting system 102 relative to conventional systems. For example, researchers have conducted image inpainting experiment at resolution 512×512 on the Places2 dataset. An experimental embodiment of the class-specific image inpainting system 102 ("CM-GAN") was trained with Adam optimizer. The learning rate and batch size were set to 0.001 and 32, respectively. CM-GAN takes the resized image as input, so that the model can predict the global structure of an image. Researchers applied flip augmentation to increase the training samples.

For the numerical evaluation, researchers computed PSNR, SSIM, Frchet Inception Distance (FID), and Perceptual Image Patch Similarity Distance (LPIPS). Researchers also adopted the Paired/Unpaired Inception Discriminative Score (P-IDS/U-IDS) [56] for evaluation. As shown, researchers compared the results of CoModGAN, Lama, and ProFill in addition to a variety of other systems, including those described by:

Roman Suvorov, Elizaveta Logacheva, Anton Mashikhin, Anastasia Remizova, Arsenii Ashukha, Aleksei Silvestrov, Naejin Kong, Harshith Goka, Kiwoong Park, and Victor Lempitsky, in Resolution-robust large mask inpainting with fourier convolutions, arXiv preprint arXiv:2109.07161 (2021) (hereinafter "LaMa");

Yu Zeng, Zhe Lin, Jimei Yang, Jianming Zhang, Eli Shechtman, and Huchuan Lu in High-resolution image inpainting with iterative confidence feedback and guided upsampling, arXiv preprint arXiv:2005.11742 (2020) (hereinafter "ProFill");

Yu Zeng, Zhe Lin, Huchuan Lu, and Vishal M. Patel in Cr-fill: Generative image inpainting with auxiliary contextual reconstruction, Proceedings of the IEEE International Conference on Computer Vision (2021) (hereinafter "CRFill");

Jiahui Yu, The Lin, Jimei Yang, Xiaohui Shen, Xin Lu, and Thomas S Huang in Free-form image inpainting with gated convolution, Proceedings of the IEEE International Conference
on Computer Vision, pages 4471-4480 (2019) (hereinafter "DeepFill v2");

Jialun Peng, Dong Liu, Songcen Xu, and Houqiang Li in Generating diverse structure for image inpainting with hierarchical vq-vae, Proceedings of the IEEE/CVF Conference on Computer Vision and Pattern Recognition (CVPR), pages 10775-10784 (2021) (hereinafter "DiverseStructure");

Kamyar Nazeri, Eric Ng, Tony Joseph, Faisal Z Qureshi, and Mehran Ebrahimi in Edgeconnect: Generative image inpainting with adversarial edge learning. arXiv preprint arXiv:1901.00212 (2019) (hereinafter "EdgeConnect");

Ziyu Wan, Jingbo Zhang, Dongdong Chen, and Jing Liao in High-fidelity pluralistic image completion with transformers, arXiv preprint arXiv:2103.14031 (2021) (hereinafter "ICT");

Zili Yi, Qiang Tang, Shekoofeh Azizi, Daesik Jang, and Than Xu, in Contextual residual aggregation for ultra high-resolution image inpainting, Proceedings of the IEEE/CVF Conference on Computer Vision and Pattern Recognition, pages 7508-7517 (2020) (hereinafter "HiFill");

Yurui Ren, Xiaoming Yu, Ruonan Zhang, Thomas H. Li, Shan Liu, and Ge Li, in Structureflow: Image inpainting via structure-aware appearance flow, IEEE International Conference on Computer Vision (ICCV) (2019) (hereinafter "StructureFlow"); and Yibing Song Wei Huang Hongyu Liu, Bin Jiang and Chao Yang in Rethinking image inpainting via a mutual encoderdecoder with feature equalizations, Proceedings of the European Conference on Computer Vision (2020) (hereinafter "MEDFE").

FIG. 11 presents the results against these other systems. Results showed that the experimental embodiment of the class-specific image inpainting system 102 (CM-GAN) significantly outperforms all other methods in terms of FID, U-IDS and P-IDS. Compared to LaMa, the CM-GAN reduced FID by over 50% from 3.864 to 1.749, and is similar in terms of LPIPS, which can be explained by the typically blurry results of LaMa versus the sharper results of CM-GAN.

In addition, FIG. 12 illustrates inference complexities of various models. As shown, the experimental embodiment of the class-specific image inpainting system 102 has a similar number of parameters (and sometimes fewer) relative to CoModGAN and LaMa.

Figure 13:
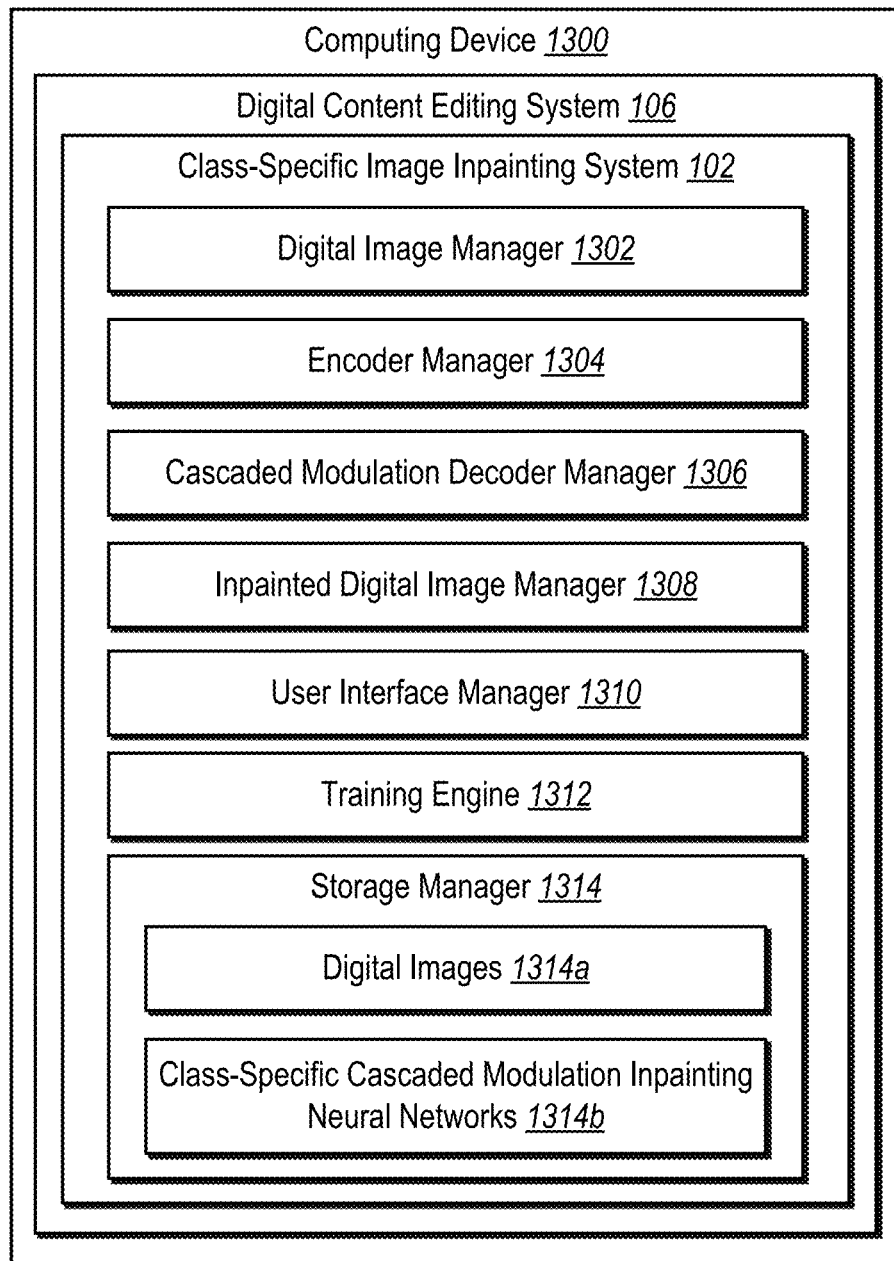
FIG. 13 illustrates a schematic diagram of a class-specific image inpainting system in accordance with one or more embodiments.

Looking now to FIG. 13, additional detail will be provided regarding components and capabilities of the class-specific image inpainting system 102. Specifically, FIG. 13 illustrates an example schematic diagram of the class-specific image inpainting system 102 on an example computing device 1300 (e.g., one or more of the client device 108 and/or the server(s) 104). As shown in FIG. 13, the class-specific image inpainting system 102 includes an incomplete digital image manager 1302, an encoder manager 1304, cascaded modulation decoder manager 1306, an inpainted digital image manager 1308, a user interface manager 1310, a training engine 1312, and a storage manager 1314.

As just mentioned, the class-specific image inpainting system 102 includes the incomplete digital image manager 1302. In particular, the incomplete digital image manager 1302 obtains, identifies, receives, generates, and/or or utilizes incomplete digital images. For example, as discussed above, the incomplete digital image manager 1302 can receive an incomplete digital image comprising a digital image with a hole or mask representing a replacement region. Moreover, the incomplete digital image manager 1302 can also receive an indication of a target object class for filling a replacement region.

As further mentioned, the class-specific image inpainting system 102 includes the encoder manager 1304. In particular, the encoder manager 1304 manages, trains, maintains, performs, implements, applies, or utilizes an encoder of a cascaded modulation inpainting neural network. For example, the encoder manager 1304 utilizes the above-described techniques to generate encoded feature vectors (e.g., a global feature code) corresponding to an incomplete digital image.

As shown, the class-specific image inpainting system 102 also includes the cascaded modulation decoder manager 1306. In particular, the cascaded modulation decoder manager 1306 trains, manages, maintains, performs, implements, or applies cascaded modulation decoder of a cascaded modulation inpainting neural network. For example, the cascaded modulation decoder manager 1306 applies a plurality of cascaded modulation layers (as described above) to generate global feature maps and local feature maps for determining replacement pixels for a replacement region.

The encoder manager 1304 and/or the cascaded modulation decoder manager 1306 can also select a class-specific cascaded modulation inpainting neural network corresponding to a particular target object class (e.g., from a plurality of class-specific cascaded modulation inpainting neural networks corresponding to different target object classes).

The class-specific image inpainting system 102 also includes the inpainted digital image manager 1308. For example, the inpainted digital image manager 1308 can identify, generate, provide, and/or display an inpainted digital image. To illustrate, the inpainted digital image manager 1308 can identify replacement pixels (as generated by the cascaded modulation decoder manager 1306) to generate an inpainted digital image.

The class-specific image inpainting system 102 also includes a user interface manager 1310. The user interface manager 1310 can manage, generate, monitor, and/or provide user interfaces. For example, the user interface manager can receive user input from one or more user interfaces (e.g., indicating user selections of digital images, replacement regions, and/or target object classes). Similarly, the user interface manager 1310 can provide user interface elements for display via a display device of a client device. For example, the user interface manager 1310 can provide an inpainted digital image for display via a graphical user interface and a target object class selection element.

The class-specific image inpainting system 102 also includes a training engine 1312. The training engine 1312 can teach, learn, and/or train a machine learning model, such as a class-specific cascaded modulation inpainting neural network. For example, as described above, the training engine 1312 can modify parameters of a class-specific cascaded modulation inpainting neural network based on predicted inpainted digital images generated from class-segmented training digital images (e.g., utilizing an adversarial loss).

The class-specific image inpainting system 102 further includes a storage manager 1314. The storage manager 1314 operates in conjunction with, or includes, one or more memory devices (such as the database 112) that stores various data such as digital images 1314a (e.g., incomplete digital images or inpainted digital images) and/or a cascaded modulation generative neural network(s) 1314b (e.g., the various parameters/layers of encoders and decoders as described above for different class-specific cascaded modulation inpainting neural networks trained for different object classes). For instance, the storage manager 1314 can include a memory device comprising digital images portraying an object class, and a discriminator neural network and a cascaded modulation inpainting neural network comprising an encoder and a decoder, wherein the decoder comprises a plurality of cascaded modulation layers.

In one or more embodiments, each of the components of the class-specific image inpainting system 102 are in communication with one another using any suitable communication technologies. Additionally, the components of the class-specific image inpainting system 102 is in communication with one or more other devices including one or more client devices described above. It will be recognized that although the components of the class-specific image inpainting system 102 are shown to be separate in FIG. 13, any of the subcomponents may be combined into fewer components, such as into a single component, or divided into more components as may serve a particular implementation. Furthermore, although the components of FIG. 13 are described in connection with the class-specific image inpainting system 102, at least some of the components for performing operations in conjunction with the class-specific image inpainting system 102 described herein may be implemented on other devices within the environment.

The components of the class-specific image inpainting system 102 include software, hardware, or both. For example, the components of the class-specific image inpainting system 102 include one or more instructions stored on a computer-readable storage medium and executable by processors of one or more computing devices (e.g., the computing device 1300). When executed by the one or more processors, the computer-executable instructions of the class-specific image inpainting system 102 cause the computing device 1300 to perform the methods described herein. Alternatively, the components of the class-specific image inpainting system 102 comprise hardware, such as a special purpose processing device to perform a certain function or group of functions. Additionally, or alternatively, the components of the class-specific image inpainting system 102 include a combination of computer-executable instructions and hardware.

Furthermore, the components of the class-specific image inpainting system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the class-specific image inpainting system 102 may be implemented as part of a stand-alone application on a personal computing device or a mobile device. Alternatively, or additionally, the components of the class-specific image inpainting system 102 may be implemented in any application that allows creation and delivery of content to users, including, but not limited to, applications in ADOBE® EXPERIENCE MANAGER and CREATIVE CLOUD®, such as PHOTOSHOP®, LIGHTROOM®, and INDESIGN®. "ADOBE," "ADOBE EXPERIENCE MANAGER," "CREATIVE CLOUD," "PHOTOSHOP," "LIGHTROOM," and "INDESIGN" are either registered trademarks or trademarks of Adobe Inc. in the United States and/or other countries.

FIGS. 1-13 the corresponding text, and the examples provide a number of different systems, methods, and non-transitory computer readable media for training a generative inpainting neural network via object-aware training and/or masked regularization for accurate digital image inpainting. In addition to the foregoing, embodiments can also be described in terms of flowcharts comprising acts for accomplishing a particular result. For example, FIG. 14 illustrates flowcharts of example sequences or series of acts in accordance with one or more embodiments.

While FIG. 14 illustrates acts according to particular embodiments, alternative embodiments may omit, add to, reorder, and/or modify any of the acts shown in FIG. 14. The acts of FIG. 14 can be performed as part of a method. Alternatively, a non-transitory computer readable medium can comprise instructions, that when executed by one or more processors, cause a computing device to perform the acts of FIG. 14. In still further embodiments, a system can perform the acts of FIG. 14. Additionally, the acts described herein may be repeated or performed in parallel with one another or in parallel with different instances of the same or other similar acts.

FIG. 14 illustrates an example series of acts 1400 for generating an inpainted digital image utilizing a class-specific (cascaded modulation) inpainting neural network. In particular, the series of acts 1400 includes an act 1402 of receiving an indication of a replacement region of a digital image and a target object class. For example, in one or more embodiments the act 1402 includes receiving, via a user interface of a client device, an indication of a replacement region of a digital image and a target object class.

To illustrate, in one or more embodiments, receiving the indication of the replacement region and the target object class comprises: providing, for display via the user interface, the digital image; and receiving, via the user interface, a user selection corresponding to the replacement region utilizing a selection tool corresponding to the target object class. Moreover, in one or more embodiments, the act 1402 includes determining the replacement region utilizing a segmentation model and the user selection.

In addition, the series of acts 1400 includes an act 1404 of generating replacement pixels utilizing a class-specific (cascaded modulation) inpainting neural network. For example, in one or more embodiments the act 1404 includes generating replacement pixels for the replacement region utilizing a class-specific (cascaded modulation) inpainting neural network corresponding to the target object class.

In one or more implementations, the act 1404 includes generating a mask corresponding to the replacement region; and generating the replacement pixels from the mask and the digital image utilizing the class-specific (cascaded modulation) inpainting neural network. Moreover, in some implementations, the act 1404 includes generating the replacement pixels utilizing a class-specific (cascaded modulation) inpainting neural network corresponding to at least one of: a sky object class, a water object class, a ground object class, or a human object class.

For example, in one or more embodiments, generating the replacement pixels utilizing a class-specific (cascaded modulation) inpainting neural network comprises generating an image encoding utilizing encoder layers of the class-specific (cascaded modulation) inpainting neural network. Moreover, generating the image encoding utilizing the encoder layers of the class-specific (cascaded modulation) inpainting neural network comprises: generating positional encodings corresponding to different resolutions of the encoder layers; and generating a plurality of encoding feature vectors utilizing the encoder layers and the positional encodings.

Furthermore, in one or more implementations, generating the replacement pixels comprises generating the replacement pixels utilizing cascaded modulation decoder layers of the class-specific cascaded modulation inpainting neural network from the image encoding.

Moreover, the series of acts 1400 includes an act 1406 of providing an inpainted digital image comprising the replacement pixels such that the inpainted digital image portrays an instance of the target object class. For example, in one or more embodiments the act 1406 includes providing, for display via the client device, an inpainted digital image comprising the replacement pixels such that the inpainted digital image portrays an instance of the target object class within the replacement region.

In one or more implementations, the series of acts 1400 includes receiving, via a user interface of a client device, an indication to replace a sky replacement region of a digital image; generating a plurality of sky replacement pixels for the sky replacement region utilizing a class-specific (cascaded modulation) inpainting neural network trained to generate sky regions for digital images; and providing, for display via the client device, an inpainted digital image comprising the plurality of sky replacement pixels within the sky replacement region.

For instance, in one or more implementations the series of acts 1400 includes determining the sky replacement region from the digital image utilizing a segmentation model. In addition, in one or more embodiments, the series of acts 1400 includes selecting the class-specific (cascaded modulation) inpainting neural network trained to generate sky regions from a plurality of class-specific (cascaded modulation) inpainting neural networks based on the indication to replace the sky replacement region.

Moreover, in some implementations, the series of acts 1400 includes generating the sky replacement pixels utilizing cascaded modulation decoder layers of the class-specific cascaded modulation inpainting neural network from an image encoding. In addition, in one or more implementations, generating the sky replacement pixels comprises generating positional encodings corresponding to different resolutions of the cascaded modulation decoder layers In addition, in one or more implementations, the series of acts 1400 includes generating the sky replacement pixels utilizing the cascaded modulation decoder layers of the class-specific cascaded modulation inpainting neural network, the image encoding, and the positional encodings.

In some implementations, the series of acts 1400 includes a different set of acts (i.e., different than those shown in FIG. 14). For example, in some implementations, the series of acts 1400 includes: generating class-segmented digital images by segmenting instances of the object class from the digital images; generating a plurality of predicted inpainted digital images for the object class from the class-segmented digital images utilizing the (cascaded modulation) inpainting neural network; and modifying parameters of the (cascaded modulation) inpainting neural network to generate a class-specific (cascaded modulation) inpainting neural network utilizing the discriminator neural network and an adversarial loss.

For example, in some embodiments segmenting instances of the object class from the plurality of images comprises: determining segmentation masks corresponding to the object class from the digital images; generating dilated segmentation masks from the segmentation masks utilizing a dilation operation; and segmenting the instances of the object class from the digital images utilizing the dilated segmentation masks.

Similarly, in some implementations, generating the plurality of predicted inpainted digital images for the object class comprises generating an image encoding utilizing Fourier convolutional encoder layers of the encoder of the class-specific (cascaded modulation) inpainting neural network.

Moreover, in one or more embodiments, generating the plurality of predicted inpainted digital images for the object class comprises generating the plurality of predicted inpainted digital images from the image encoding utilizing the cascaded modulation layers of the class-specific cascaded modulation inpainting neural network, wherein a given cascaded modulation layer comprises a global modulation block and a spatial modulation block.

Furthermore, in some implementations, modifying the parameters of the (cascaded modulation) inpainting neural network to generate the class-specific (cascaded modulation) inpainting neural network comprises: generating an authenticity prediction from a predicted inpainted digital image utilizing the discriminator neural network; and determining the adversarial loss based on the authenticity prediction.

In one or more embodiments, generating the class-segmented digital images comprises segmenting, from the digital images, instances of one of: a sky object class, a water object class, a ground object class, or a human object class.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 15:
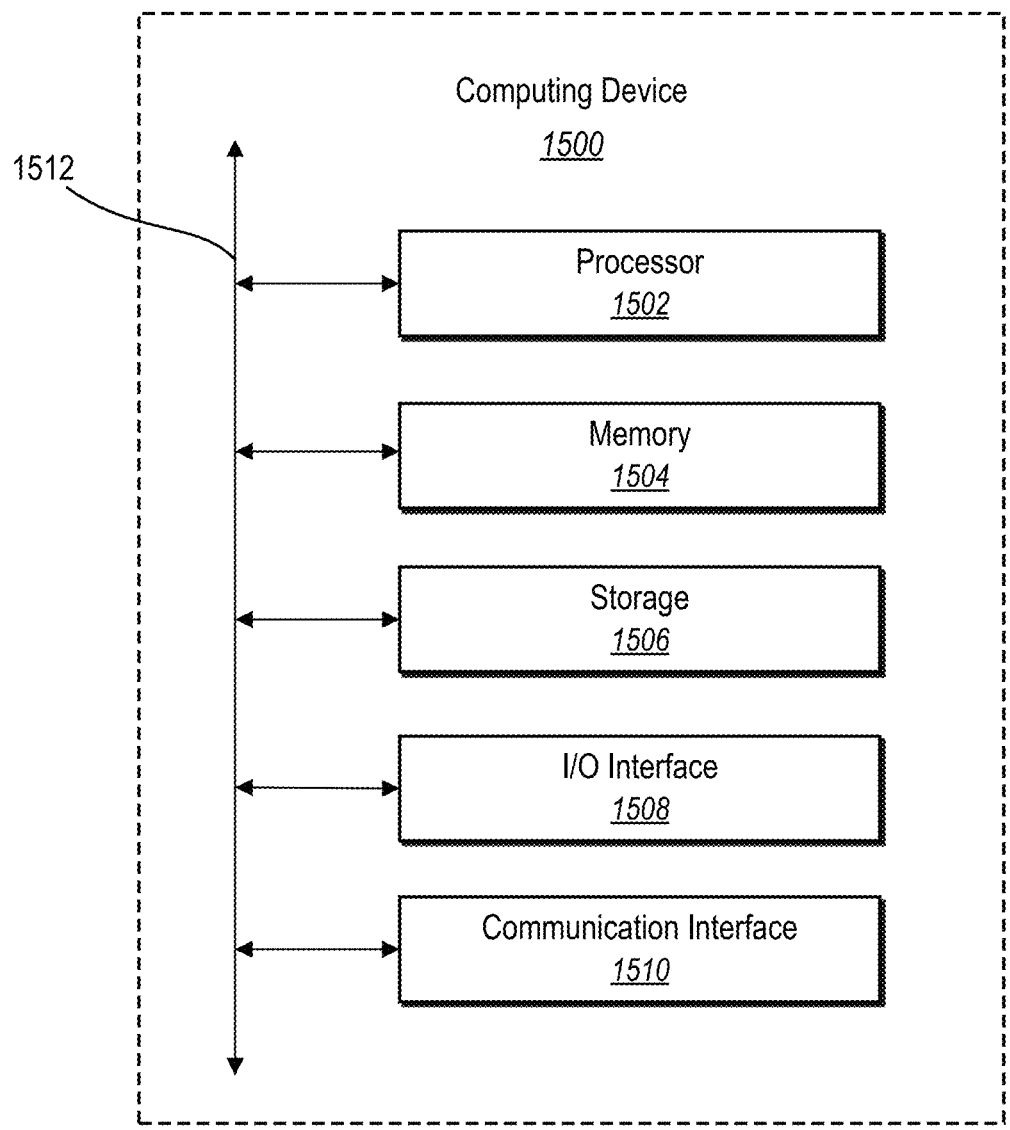
FIG. 15 illustrates a block diagram of an example computing device in accordance with one or more embodiments.

FIG. 15 illustrates, in block diagram form, an example computing device 1500 (e.g., the computing device 1500, the client device 108, and/or the server(s) 104) that may be configured to perform one or more of the processes described above. One will appreciate that the class-specific image inpainting system 102 can comprise implementations of the computing device 1500. As shown by FIG. 15, the computing device can comprise a processor 1502, memory 1504, a storage device 1506, an I/O interface 1508, and a communication interface 1510. Furthermore, the computing device 1500 can include an input device such as a touchscreen, mouse, keyboard, etc. In certain embodiments, the computing device 1500 can include fewer or more components than those shown in FIG. 15. Components of computing device 1500 shown in FIG. 15 will now be described in additional detail.

In particular embodiments, processor(s) 1502 includes hardware for executing instructions, such as those making up a computer program. As an example, and not by way of limitation, to execute instructions, processor(s) 1502 may retrieve (or fetch) the instructions from an internal register, an internal cache, memory 1504, or a storage device 1506 and decode and execute them.

The computing device 1500 includes memory 1504, which is coupled to the processor(s) 1502. The memory 1504 may be used for storing data, metadata, and programs for execution by the processor(s). The memory 1504 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1504 may be internal or distributed memory.

The computing device 1500 includes a storage device 1506 includes storage for storing data or instructions. As an example, and not by way of limitation, storage device 1506 can comprise a non-transitory storage medium described above. The storage device 1506 may include a hard disk drive (HDD), flash memory, a Universal Serial Bus (USB) drive or a combination of these or other storage devices.

The computing device 1500 also includes one or more input or output ("I/O") devices/interfaces 1508, which are provided to allow a user to provide input to (such as user strokes), receive output from, and otherwise transfer data to and from the computing device 1500. These I/O devices/interfaces 1508 may include a mouse, keypad or a keyboard, a touch screen, camera, optical scanner, network interface, modem, other known I/O devices or a combination of such I/O devices/interfaces 1508. The touch screen may be activated with a writing device or a finger.

The I/O devices/interfaces 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1508 is configured to provide graphical data to a display for presentation to a user. The graphical data may be representative of one or more graphical user interfaces and/or any other graphical content as may serve a particular implementation.

The computing device 1500 can further include a communication interface 1510. The communication interface 1510 can include hardware, software, or both. The communication interface 1510 can provide one or more interfaces for communication (such as, for example, packet-based communication) between the computing device and one or more other computing devices 1500 or one or more networks. As an example, and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI. The computing device 1500 can further include a bus 1512. The bus 1512 can comprise hardware, software, or both that couples components of computing device 1500 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium storing instructions thereon that, when executed by at least one processor, cause the at least one processor to perform operations comprising:
   receiving, via a user interface of a client device, an indication of a replacement region of a digital image and a target object class;
   generating replacement pixels for the replacement region utilizing a class-specific inpainting neural network corresponding to the target object class and having a plurality of cascaded modulation layers, wherein a given cascaded modulation layer comprises a global modulation block and a spatial modulation block, by:
   utilizing the global modulation blocks of the plurality of cascaded modulation layers to apply a modulation based on a global feature code to capture global predictions; and
   utilizing the spatial modulation blocks of the plurality of cascaded modulation layers to apply a spatial modulation to refine the global predictions; and
   providing, for display via the client device, an inpainted digital image comprising the replacement pixels such that the inpainted digital image portrays an instance of the target object class within the replacement region.

2. The non-transitory computer readable medium of claim 1, wherein receiving the indication of the replacement region and the target object class comprises:
   providing, for display via the user interface, the digital image; and
   receiving, via the user interface, a user selection corresponding to the replacement region utilizing a selection tool corresponding to the target object class.

3. The non-transitory computer readable medium of claim 2, further comprising: determining the replacement region utilizing a segmentation model and the user selection.

4. The non-transitory computer readable medium of claim 1, further comprising instructions that, when executed by at least one processor, cause the at least one processor to perform operations comprising:

utilizing the global modulation block to generate a global feature map to apply a modulation based on a global feature code; and utilizing the spatial modulation block to perform a spatial modulation utilizing the global feature map.

5. The non-transitory computer readable medium of claim 1, further comprising instructions that, when executed by at least one processor, cause the at least one processor to perform operations comprising generating the replacement pixels utilizing the class-specific inpainting neural network corresponding to at least one of: a sky object class, a water object class, a ground object class, or a human object class.

6. The non-transitory computer readable medium of claim 1, wherein generating the replacement pixels utilizing the class-specific inpainting neural network comprises generating an image encoding utilizing encoder layers of a class-specific cascaded modulation inpainting neural network.

7. The non-transitory computer readable medium of claim 6, wherein generating the image encoding utilizing the encoder layers of the class-specific cascaded modulation inpainting neural network comprises:
  generating positional encodings corresponding to different resolutions of the encoder layers; and
  generating a plurality of encoding feature vectors utilizing the encoder layers and the positional encodings.

8. The non-transitory computer readable medium of claim 6, wherein generating the replacement pixels comprises generating the replacement pixels utilizing cascaded modulation decoder layers of the class-specific cascaded modulation inpainting neural network from the image encoding.

9. A computer-implemented method comprising:
  receiving, via a user interface of a client device, a user interaction with a digital image comprising an indication to replace a sky replacement region of the digital image;
  determining, utilizing a panoptic segmentation model, a sky target object class based on the indication to replace the sky replacement region of a digital image;
  selecting, based on the indicated sky target object class, a class-specific cascaded modulation inpainting neural network trained to generate sky regions for digital images;
  generating sky replacement pixels for the sky replacement region utilizing the class-specific cascaded modulation inpainting neural network trained to generate sky regions for digital images and having a plurality of cascaded modulation layers, wherein a given cascaded modulation layer comprises a global modulation block and a spatial modulation block, by:
    utilizing the global modulation blocks of the plurality of cascaded modulation layers to apply a modulation based on a global feature code to capture global predictions; and
    utilizing the spatial modulation blocks of the plurality of cascaded modulation layers to apply a spatial modulation to refine the global predictions; and
  providing, for display via the client device, an inpainted digital image comprising the sky replacement pixels within the sky replacement region.

10. The computer-implemented method of claim 9, further comprising determining the sky replacement region based on user input selecting a portion of the digital image.

11. The computer-implemented method of claim 9, further comprising:
  selecting the class-specific cascaded modulation inpainting neural network trained to generate sky regions from a plurality of class-specific cascaded modulation inpainting neural networks based on the indication to replace the sky replacement region.

12. The computer-implemented method of claim 9, further comprising generating the sky replacement pixels utilizing cascaded modulation decoder layers of the class-specific cascaded modulation inpainting neural network from an image encoding.

13. The computer-implemented method of claim 12, wherein generating the sky replacement pixels comprises generating positional encodings corresponding to different resolutions of the cascaded modulation decoder layers.

14. The computer-implemented method of claim 13, further comprising generating the sky replacement pixels utilizing the cascaded modulation decoder layers of the class-specific cascaded modulation inpainting neural network, the image encoding, and the positional encodings.

15. A system comprising:
  one or more memory devices; and
  one or more processors configured to cause the system to:
    receive, via a user interface of a client device, an indication of a replacement region of a digital image and a target object class;
    generate replacement pixels for the replacement region utilizing a class-specific inpainting neural network corresponding to the target object class and having a plurality of cascaded modulation layers, wherein a given cascaded modulation layer comprises a global modulation block and a spatial modulation block, by:
      utilizing the global modulation blocks of the plurality of cascaded modulation layers to apply a modulation based on a global feature code to capture global predictions; and
      utilizing the spatial modulation blocks of the plurality of cascaded modulation layers to apply a spatial modulation to refine the global predictions;
    provide, for display via the client device, an inpainted digital image comprising the replacement pixels such that the inpainted digital image portrays an instance of the target object class within the replacement region.

16. The system of claim 15, wherein receiving the indication of the replacement region and the target object class comprises:
  providing, for display via the user interface, the digital image; and
  receiving, via the user interface, a user selection corresponding to the replacement region utilizing a selection tool corresponding to the target object class.

17. The system of claim 16, wherein the one or more processors are further configured to cause the system to determine the replacement region utilizing a segmentation model and the user selection.

18. The system of claim 15, wherein the one or more processors are further configured to cause the system to:
  utilizing the global modulation block to generate a global feature map to apply a modulation based on a global feature code; and
  utilizing the spatial modulation block to perform a spatial modulation utilizing the global feature map.

19. The system of claim 15, wherein generating the replacement pixels utilizing the class-specific inpainting neural network comprises generating an image encoding utilizing encoder layers of a class-specific cascaded modulation inpainting neural network.

20. The system of claim 19, wherein generating the image encoding utilizing the encoder layers of the class-specific cascaded modulation inpainting neural network comprises:

generating positional encodings corresponding to different resolutions of the encoder layers; and
generating a plurality of encoding feature vectors utilizing the encoder layers and the positional encodings.

* * * * *